United States Patent
Shaga

(10) Patent No.: US 12,339,139 B2
(45) Date of Patent: Jun. 24, 2025

(54) ANGULAR-POSITION SENSOR

(71) Applicant: Microchip Technology Incorporated, Chandler, AZ (US)

(72) Inventor: Ganesh Shaga, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 150 days.

(21) Appl. No.: 17/809,842

(22) Filed: Jun. 29, 2022

(65) Prior Publication Data

US 2023/0104667 A1    Apr. 6, 2023

(30) Foreign Application Priority Data

Sep. 28, 2021   (IN) .............................. 202141043833

(51) Int. Cl.
*G01D 5/20*    (2006.01)
*G01D 5/22*    (2006.01)

(52) U.S. Cl.
CPC ........... *G01D 5/204* (2013.01); *G01D 5/2073* (2013.01); *G01D 5/2275* (2013.01)

(58) Field of Classification Search
CPC .......................................... G01D 5/204–2275
See application file for complete search history.

(56) References Cited

U.S. PATENT DOCUMENTS

| | | |
|---|---|---|
| 1,639,044 A | 8/1927 | Mansbridge |
| 3,197,763 A | 7/1965 | Fisher |
| 3,281,826 A | 10/1966 | Moffitt |
| 4,223,300 A | 9/1980 | Wiklund |

(Continued)

FOREIGN PATENT DOCUMENTS

| | | |
|---|---|---|
| CN | 106255889 A | 12/2016 |
| CN | 108351224 A | 7/2018 |

(Continued)

OTHER PUBLICATIONS

Microchip Technology Inc., "Inductive Sensor Interface IC with Embedded MCU", Summary Data Sheet LX3302A, DS20006496A (Feb. 2020) 48 pages.

(Continued)

*Primary Examiner* — Steven L Yeninas
(74) *Attorney, Agent, or Firm* — TraskBritt

(57) ABSTRACT

An apparatus comprising: a support structure; and a first electrically-conductive material arranged at the support structure to define a first continuous path for first electrical current to flow between a first location and a second location, the first continuous path comprising: a first path portion defining a first generally-clockwise path for the first electrical current to flow around a first axis, the first path portion including a first inner-circumferential portion and a first outer-circumferential portion, the first inner-circumferential portion located closer to a central axis than the first outer-circumferential portion, a radius of curvature of the first inner-circumferential portion being greater than a radius of curvature of the first outer-circumferential portion; and a second path portion defining a first generally-counter-clockwise path for the first electrical current to flow around a second axis, the first path portion and the second path portion circumferentially arranged around the central axis. Related devices, systems and methods are also disclosed.

16 Claims, 13 Drawing Sheets

(56) References Cited

U.S. PATENT DOCUMENTS

| | | |
|---|---|---|
| 4,356,732 A | 11/1982 | Hachtel et al. |
| 4,737,698 A | 4/1988 | McMullin et al. |
| 4,847,548 A | 7/1989 | Lafler |
| 4,853,604 A | 8/1989 | McMullin et al. |
| 5,061,896 A | 10/1991 | Schmidt |
| 5,239,288 A | 8/1993 | Tsals |
| 6,111,402 A | 8/2000 | Fischer |
| 6,236,199 B1 | 5/2001 | Irle et al. |
| 6,239,571 B1 | 5/2001 | Shimahara |
| 6,255,810 B1 | 7/2001 | Irle et al. |
| 6,304,014 B1 | 10/2001 | England et al. |
| 6,304,076 B1 | 10/2001 | Madni et al. |
| 6,384,598 B1 | 5/2002 | Hobein et al. |
| 6,483,295 B2 | 11/2002 | Irle et al. |
| 6,522,128 B1 | 2/2003 | Ely et al. |
| 6,591,217 B1 | 7/2003 | Baur et al. |
| 6,593,730 B2 | 7/2003 | Zapf |
| 6,605,940 B1 | 8/2003 | Tabrizi et al. |
| 7,276,897 B2 | 10/2007 | Lee |
| 7,385,389 B2 | 6/2008 | Tahara et al. |
| 7,719,264 B2 | 5/2010 | Tiemann |
| 7,726,208 B2 | 6/2010 | Hoeller et al. |
| 7,821,256 B2 | 10/2010 | Lee |
| 7,906,960 B2 | 3/2011 | Lee |
| 8,278,911 B2 | 10/2012 | Tiemann et al. |
| 8,339,126 B2 | 12/2012 | Izak et al. |
| 8,345,438 B2 | 1/2013 | Mi et al. |
| 8,451,000 B2 | 5/2013 | Tiemann |
| 8,482,894 B2 | 7/2013 | Yra et al. |
| 8,508,242 B2 | 8/2013 | Shao et al. |
| 8,618,791 B2 | 12/2013 | Grinberg et al. |
| 8,928,310 B2 | 1/2015 | Ocket et al. |
| 8,947,077 B2 | 2/2015 | Lee et al. |
| 8,988,066 B2 | 3/2015 | Shao et al. |
| 9,234,771 B2 | 1/2016 | Sasaki |
| 9,300,022 B2 | 3/2016 | Vaisman |
| 9,322,636 B2 | 4/2016 | Fontanet |
| 9,528,858 B2 | 12/2016 | Bertin |
| 9,677,913 B2 | 6/2017 | Wang et al. |
| 9,929,651 B2 | 3/2018 | Cannankurichi et al. |
| 10,415,952 B2 | 9/2019 | Reddy et al. |
| 10,444,037 B2 | 10/2019 | Bertin |
| 10,760,928 B1 | 9/2020 | Shaga et al. |
| 10,761,549 B2 | 9/2020 | Sasmal et al. |
| 10,837,847 B2 | 11/2020 | Smith, Jr. |
| 10,884,037 B2 | 1/2021 | Chellamuthu et al. |
| 10,921,155 B2 | 2/2021 | Shaga et al. |
| 11,313,702 B2 | 4/2022 | Le Goff et al. |
| 11,525,701 B2 | 12/2022 | Lugani et al. |
| 11,525,716 B2 | 12/2022 | El-Shennawy et al. |
| 11,656,101 B2 | 5/2023 | Shaga |
| 2001/0001430 A1 | 5/2001 | Ely et al. |
| 2002/0000129 A1 | 1/2002 | Madni et al. |
| 2002/0097042 A1 | 7/2002 | Kawate et al. |
| 2002/0196015 A1 | 12/2002 | Zapf |
| 2003/0062889 A1 | 4/2003 | Ely et al. |
| 2003/0067941 A1 | 4/2003 | Fall |
| 2003/0206007 A1 | 11/2003 | Gass et al. |
| 2004/0065533 A1 | 4/2004 | Schwesig et al. |
| 2004/0080313 A1 | 4/2004 | Brosh |
| 2004/0081313 A1 | 4/2004 | McKnight et al. |
| 2004/0182602 A1 | 9/2004 | Satoh et al. |
| 2006/0038635 A1 | 2/2006 | Richiuso et al. |
| 2006/0119351 A1 | 6/2006 | James et al. |
| 2006/0125472 A1 | 6/2006 | Howard et al. |
| 2007/0001666 A1 | 1/2007 | Lee |
| 2008/0054887 A1 | 3/2008 | Lee |
| 2008/0164869 A1 | 7/2008 | Bach et al. |
| 2008/0174302 A1 | 7/2008 | Lee et al. |
| 2008/0176530 A1 | 7/2008 | Kuhn et al. |
| 2008/0238416 A1 | 10/2008 | Shiraga et al. |
| 2009/0079422 A1 | 3/2009 | Lee |
| 2010/0271012 A1 | 10/2010 | Patterson et al. |
| 2011/0101968 A1 | 5/2011 | Brands et al. |
| 2012/0081106 A1 | 4/2012 | Grinberg et al. |
| 2012/0175198 A1 | 7/2012 | Thibault et al. |
| 2012/0242304 A1 | 9/2012 | Yra et al. |
| 2012/0242352 A1 | 9/2012 | Gong et al. |
| 2012/0244802 A1 | 9/2012 | Feng et al. |
| 2013/0021023 A1 | 1/2013 | Niwa et al. |
| 2013/0257417 A1 | 10/2013 | Ely |
| 2013/0289826 A1 | 10/2013 | Yoshitake et al. |
| 2015/0233695 A1 | 8/2015 | Gomes et al. |
| 2015/0323348 A1 | 11/2015 | Liu et al. |
| 2015/0323349 A1 | 11/2015 | Has et al. |
| 2016/0099301 A1 | 4/2016 | Yen et al. |
| 2016/0214648 A1 | 7/2016 | Schoepe et al. |
| 2017/0141685 A1 | 5/2017 | Cannankurichi et al. |
| 2017/0158231 A1 | 6/2017 | Farrelly |
| 2017/0166251 A1 | 6/2017 | Shao et al. |
| 2018/0040413 A1 | 2/2018 | Yen et al. |
| 2018/0120083 A1 | 5/2018 | Reddy et al. |
| 2018/0196453 A1 | 7/2018 | Sasmal et al. |
| 2018/0224301 A1 | 8/2018 | Herrmann et al. |
| 2018/0274591 A1 | 9/2018 | Maniouloux et al. |
| 2018/0274948 A1 | 9/2018 | Maniouloux et al. |
| 2019/0009903 A1 | 1/2019 | Chan et al. |
| 2019/0017845 A1 | 1/2019 | Utermoehlen et al. |
| 2019/0025088 A1 | 1/2019 | Utermoehlen et al. |
| 2019/0063956 A1 | 2/2019 | Bertin |
| 2019/0094047 A1 | 3/2019 | Utermoehlen et al. |
| 2019/0186891 A1 | 6/2019 | Utermoehlen et al. |
| 2019/0195963 A1 | 6/2019 | Qama |
| 2019/0226828 A1 | 7/2019 | Lugani et al. |
| 2019/0242725 A1 | 8/2019 | Shaga et al. |
| 2019/0326501 A1 | 10/2019 | Gilbert et al. |
| 2019/0331541 A1 | 10/2019 | Janisch et al. |
| 2019/0360839 A1 | 11/2019 | Shao |
| 2020/0088549 A1 | 3/2020 | Shao |
| 2020/0200569 A1 | 6/2020 | Utermoehlen et al. |
| 2020/0271480 A1 | 8/2020 | Shaga et al. |
| 2021/0063206 A1 | 3/2021 | Ausserlechner |
| 2021/0080243 A1 | 3/2021 | Ocket et al. |
| 2021/0098187 A1 | 4/2021 | Kumar et al. |
| 2021/0180992 A1 | 6/2021 | Lugani et al. |
| 2021/0226877 A1 | 7/2021 | Tamasi et al. |
| 2021/0255657 A1 | 8/2021 | Miller et al. |
| 2021/0372823 A1 | 12/2021 | Witts et al. |
| 2022/0011138 A1 | 1/2022 | Shaga et al. |
| 2022/0034684 A1 | 2/2022 | Le Goff et al. |
| 2022/0136869 A1 | 5/2022 | Shaga |
| 2022/0155050 A1 | 5/2022 | Gillet et al. |
| 2022/0307868 A1 | 9/2022 | Shaga et al. |
| 2023/0045209 A1 | 2/2023 | Shaga |
| 2023/0175869 A1 | 6/2023 | Goldman |

FOREIGN PATENT DOCUMENTS

| | | |
|---|---|---|
| CN | 112272755 A | 1/2021 |
| CN | 112484621 A | 3/2021 |
| DE | 4021637 A1 | 1/1992 |
| DE | 10120822 A1 | 4/2002 |
| DE | 102015220615 A1 | 4/2017 |
| DE | 102019207070 A1 | 11/2020 |
| EP | 0467514 A2 | 1/1992 |
| EP | 0845659 A2 | 6/1998 |
| EP | 1078226 B1 | 10/2003 |
| EP | 1914520 A2 | 4/2008 |
| EP | 2145158 A2 | 1/2010 |
| EP | 2044389 B1 | 4/2010 |
| EP | 3245485 A1 | 11/2017 |
| EP | 3865825 A1 | 8/2021 |
| FR | 2304900 A1 | 10/1976 |
| GB | 1502697 A | 3/1978 |
| GB | 2394293 A | 4/2004 |
| JP | 3839449 B2 | 11/2006 |
| JP | 2021-025851 A | 2/2021 |
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |

(56) References Cited

FOREIGN PATENT DOCUMENTS

WO   2019/152092 A1   8/2019
WO   2021/239175 A1   12/2021

OTHER PUBLICATIONS

Microchip Technology Inc., "Robust, Low-Cost and Noise-Immune Motion-Sensing Inductive Sensors", Automotive brochure, DS00002864A, www.microchip.com/automotive (Dec. 2018) 2 pages.
Song et al., "Simulations of Nonuniform Behaviors of Multiple No-Insulation (RE)Ba2Cu3O7-x HTS Pancake Coils During Charging and Discharging", IEEE Transactions on Applied Superconductivity, vol. 26, No. 4, (Jun. 2016) 5 pages.
English Translation of WO 2021239175 (Year: 2021).
International Search Report and Written Opinion of the International Searching Authority for related application PCT/US2015/027900 mailed on Jun. 23, 2015.
International Search Report and Written Opinion, PCT/US2018/063681, dated Mar. 8, 2019.
International Search Report for International Application No. PCT/US2022/073137. Oct. 11, 2022, 6 pages.
International Search Report for International Application No. PCT/US2022/076356, mailed Dec. 2, 2022, 5 pages.
International Search Report for International Application No. PCT/US2022/078524, mailed Apr. 11, 2023, 7 pages.
International Search Report for International Application No. PCT/US2023/065238, mailed Jul. 3, 2023, 6 pages.
International Search Report for PCT/US2017/043578 dated Oct. 27, 2017 by the European Patent Office.
International Written Opinion for International Application No. PCT/US2022/073137. Oct. 11, 2022, 9 pages.
International Written Opinion for International Application No. PCT/US2022/076356, mailed Dec. 2, 2022, 10 pages.
International Written Opinion for International Application No. PCT/US2022/078524, mailed Apr. 11, 2023, 14 pages.
International Written Opinion for International Application No. PCT/US2023/065238, mailed Jul. 3, 2023, 9 pages.
PCT/US2019/042895, International Search Report, dated Oct. 21, 2019.
PCT/US2019/042895, Written Opinion of the International Search Authority, dated Oct. 21, 2019.
PCT/US2019/044245, International Search Report and Written Opinion of the International Searching Authority, International Search Authority, dated Nov. 15, 2019.
PCT/US2021/039578, International Search Report and Written Opinion, European Patent Office, mailed Oct. 14, 2021.
PCT/US21/12006, International Search Report and Written Opinion, dated Apr. 7, 2021.
PCT/US21/12018, International Search Report and Written Opinion of the International Searching Authority, European Patent Office, dated Mar. 3, 2021.
Dauth et al., An Effective Method to Model and Simulate the Behavior of Inductive Angle Encoders, Sensors 22, No. 20: 7804, Oct. 14, 2022, 26 pages.
International Search Report and Written Opinion of the International Searching Authority for related application PCT/US2015/027900 mailed on Jun. 23, 2015, 10 pages.
International Search Report and Written Opinion of the International Searching Authority of International Application No. PCT/US2019/044245, dated Nov. 15, 2019, 10 pages.
International Search Report and Written Opinion of the International Searching Authority of International Application No. PCT/US2021/012006, dated Apr. 7, 2021, 12 pages.
International Search Report and Written Opinion of the International Searching Authority of International Application No. PCT/US2021/039578, mailed Oct. 14, 2021, 10 pages.
International Search Report of International Application No. PCT/US2023/077323, mailed Jan. 22, 2024, 6 pages.
Lugani et al., High speed inductive position sensor for E-machines, Melexis Technologies SA, 2021, 7 pages.
Written Opinion of the International Searching Authority of International Application No. PCT/US2018/063681, dated Mar. 8, 2019, 7 pages.
Written Opinion of the International Searching Authority of International Application No. PCT/US2021/12018, dated Mar. 3, 2021, 5 pages.
Written Opinion of the International Searching Authority of International Application No. PCT/US2023/077323, mailed Jan. 23, 2024, 9 pages.
First Office Action and Search Report of Chinese Patent Application No. 202180096199.0, issued May 8, 2024, 32 pages with English translation.
Written Opinion of the International Search Authority of International Application No. PCT/US2019/042895, dated Oct. 21, 2019, 8 pages.
"Inductive Sensor Coil Design Using LX3301A", AN-S1412 Application Note, Microsemi Corporate Headquarters, One Enterprise, Aliso Viejo, CA 92656 USA, Nov. 2017.
A Revolution in Sensing: World's First Inductance-to-Digital Converter, LDC1000 Inductive Sensing Brochure, Texas Instruments, 2013, pp. 1-6, Almaden Press, San Jose, CA.

ANGULAR-POSITION SENSOR

CROSS-REFERENCE TO RELATED APPLICATIONS

This application claims the benefit of the priority date of Indian Provisional Patent Application No. 202141043833, filed Sep. 28, 2021, and titled "INDUCTIVE ANGULAR-POSITION SENSOR, AND RELATED DEVICES, SYSTEMS, AND METHODS," the disclosure of which is incorporated herein in its entirety by this reference.

TECHNICAL FIELD

This description relates, generally, to inductive angular-position sensors. More specifically, some examples relate to sense coils or targets for inductive angular-position sensors.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in one or more coils of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

Figure 10:
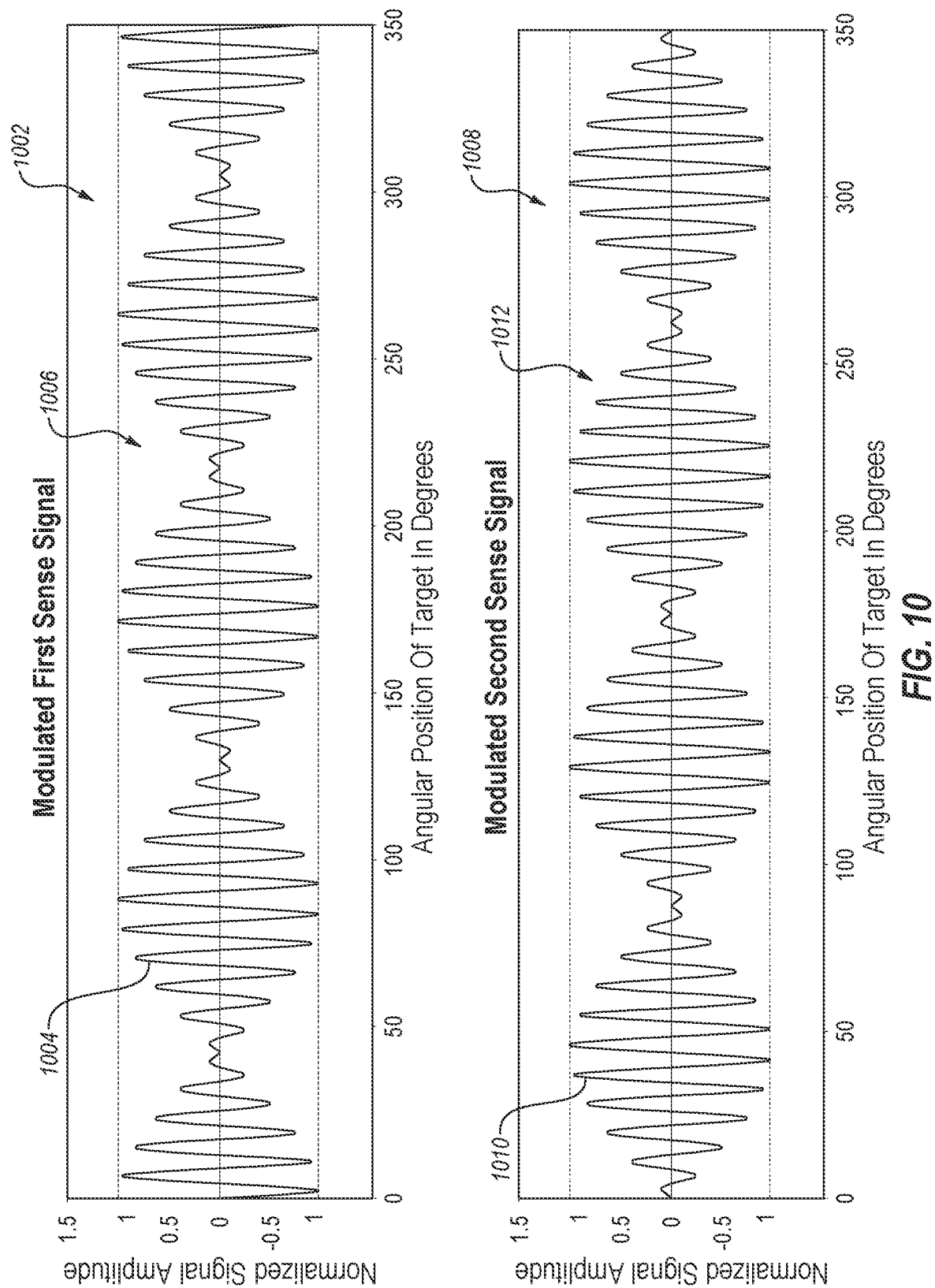

FIG. 10 includes two graphs illustrating simulated modulated signals according to one or more examples.

Figure 11:
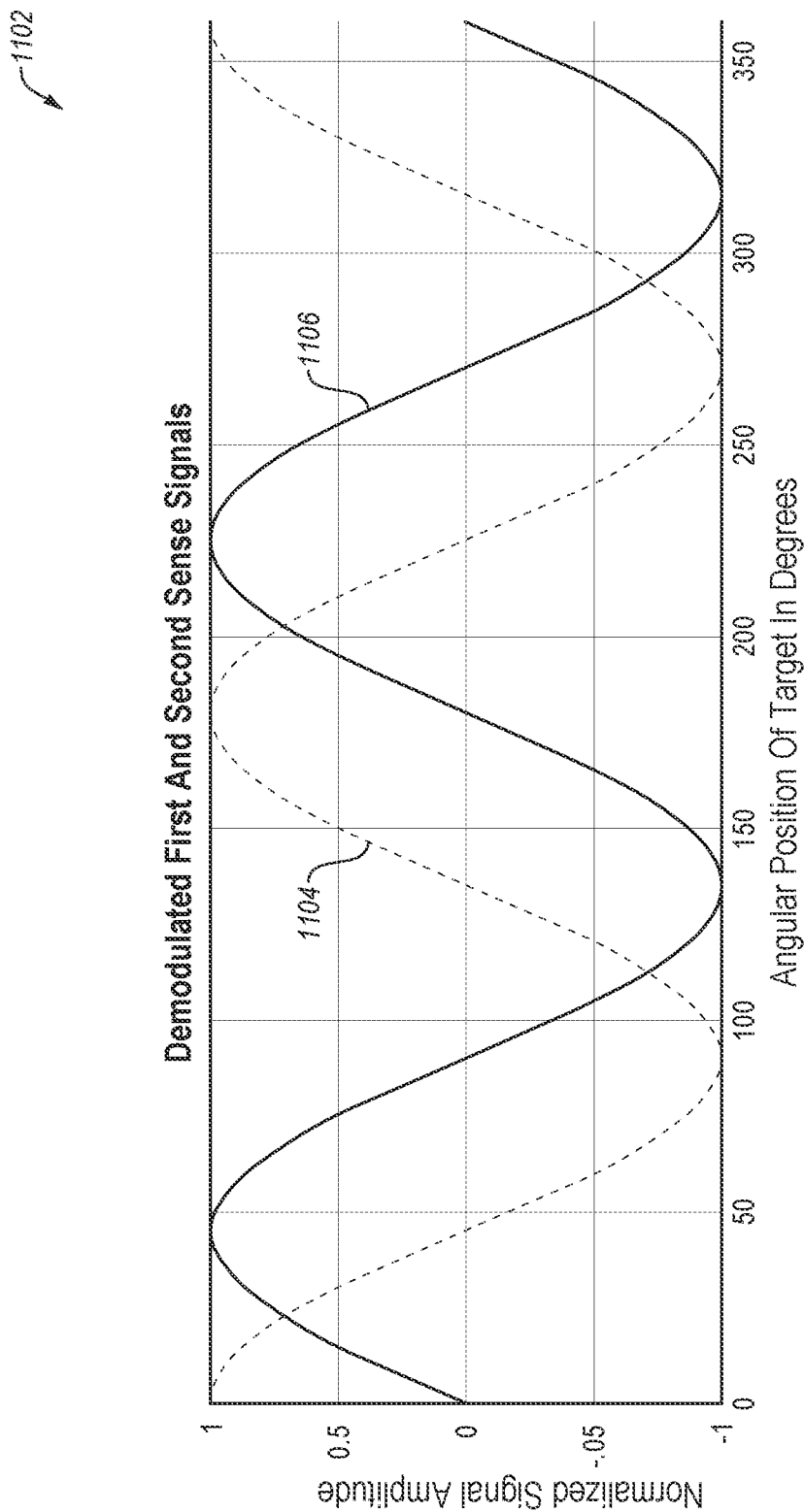

FIG. 11 is a graph 1102 illustrating a simulated demodulated first sense signal and a simulated demodulated second sense signal according to one or more examples.

Figure 12:
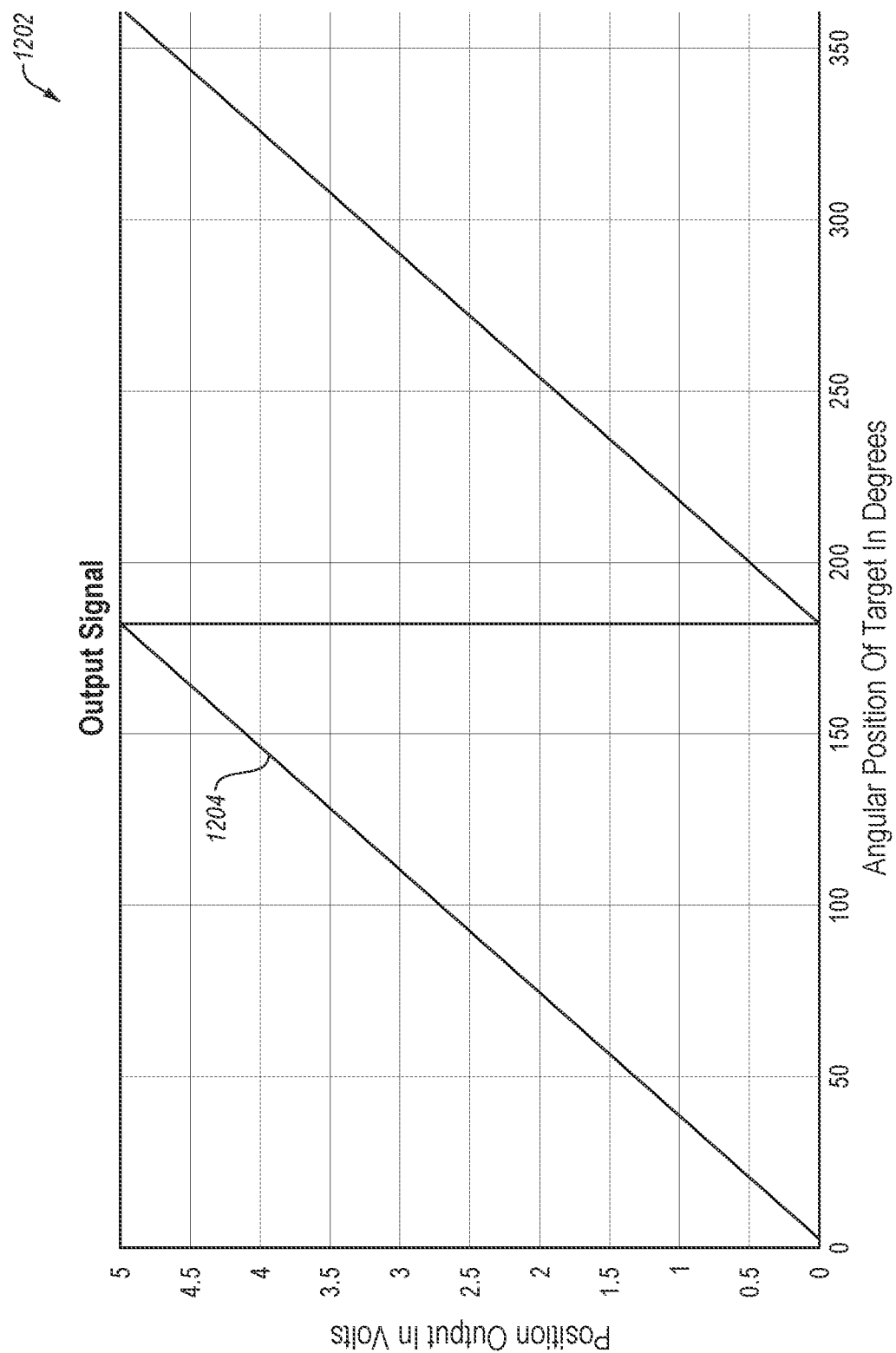

FIG. 12 is a graph illustrating a simulated output signal according to one or more examples.

Figure 13:
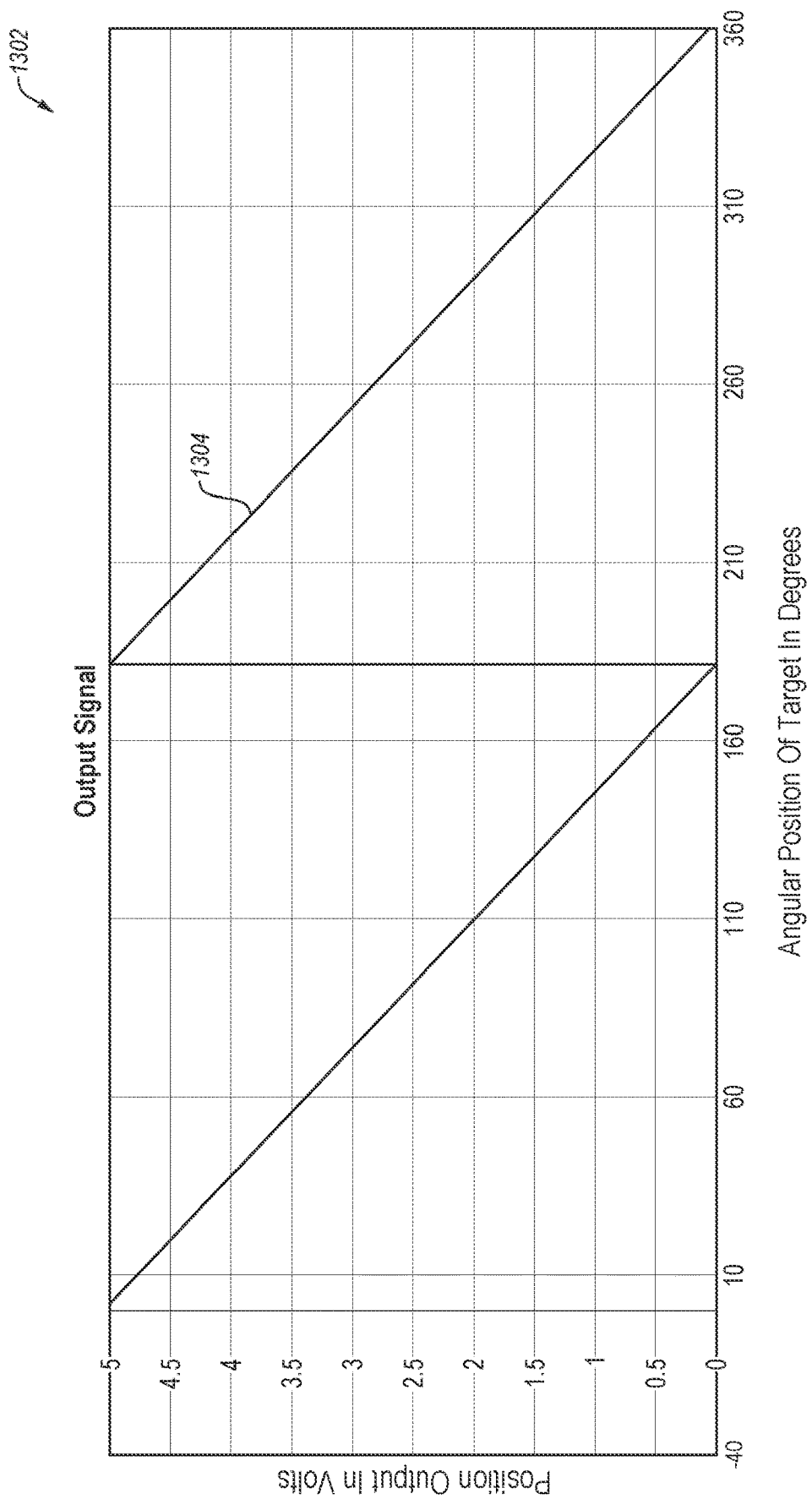

FIG. 13 is a graph illustrating a simulated output signal according to one or more examples.

DETAILED DESCRIPTION

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

An inductive angular-position sensor may include, one or more oscillator coils, a first sense coil, a second sense coil, and an integrated circuit comprising an oscillator to drive the oscillator coil and electronic circuits to receive and demodulate respective outputs of the first and second sense coils. Such an inductive angular-position sensor may determine an angular position of a target relative to the one or more oscillator coils or the sense coils.

The oscillator may generate an excitation signal. The one or more oscillator coils may be excited by the excitation signal. The oscillating signal on the one or more oscillator coils may generate a changing (oscillating) magnetic field near and especially within a space encircled by the oscillator coil.

The changing magnetic field generated by the one or more oscillator coils may induce a first oscillating voltage at ends of the first sense coil and a second oscillating voltage at ends of the second sense coil. The first oscillating voltage at the ends of the first sense coil may oscillate in response to the oscillation of the excitation signal and may be a first sense signal. The second oscillating voltage at the ends of the second sense signal may oscillate in response to the oscillation of the excitation signal and may be a second sense signal.

The target may be positioned relative to the one or more oscillator coils, the first sense coil, and the second sense coil. For example, the target, or a portion of the target, may be positioned above a portion of the one or more oscillator coils, the first sense coil, and the second sense coil, without limitation. The target may disrupt some of the changing magnetic field that passes through one or more loops of the first sense coil and the second sense coil.

The location of the target, or the portion of the target, above one or more of the first sense coil and the second sense coil may affect the first sense signal and the second sense signal induced in the first sense coil and the second sense coil respectively. For example, the target may disrupt magnetic coupling between the one or more oscillator coils and the first and second sense coils. Such disruption may affect a magnitude of the first and second sense signals induced in the first and second sense coils, respectively. For example, in response to the target, or a the portion of the target, being over a loop in the first sense coil, the amplitude of the first sense signal may be less than the amplitude of the first sense signal when the target is not over the loop in the first sense coil.

Further, the target may rotate (e.g., around an axis, without limitation) such that a portion of the target may pass over one or more loops of one or more of the first sense coil and the second sense coil. As the target rotates, the first sense signal of the first sense coil and the second sense signal of the second sense coil may be amplitude modulated in response to the rotation of the target and in response to the portion of the target passing over the loops.

In one or more examples, the integrated circuit may generate an output signal responsive to the first sense signal and the second sense signal. The output signal may be a fraction of a rail voltage based on the first sense signal and the second sense signal. The output signal may be related to an angular position of the target, or the position of the portion of the target, and successive samples of the output signal may be related to a direction of movement of the target. Thus, the inductive angular-position sensor may generate an output signal indicative of an angular-position of a target.

In one or more examples, the integrated circuit may generate a first output signal based on the first sense signal and a second output signal based on the second sense signal. The first output signal may be the first sense signal demodulated; the second output signal may be the second sense signal demodulated. Together, the two output signals may be related to an angular position of the target and subsequent samples of the first and second output signals may be indicative of rotation of the target.

In one or more examples, the integrated circuit may generate a single output signal based on the first sense signal and the second sense signal. Some examples include sense coils or targets that cause an integrated circuit to generate a constant-slope output signal in response to rotation of the target, relative to the first sense coil and the second sense coil. The constant-slope output signal may be an output signal with a known correlation between an amplitude of the output signal and the angular position of the target.

One or more examples of the present disclosure may include elements of inductive angular-position sensors (including, e.g., sense coils and targets, without limitation) which may allow such inductive angular-position sensors to provide a more accurate correlation between output signals and the angular-position of the target relative to the sense coils. In other words, one or more examples of the present disclosure may include elements for inductive angular-position sensors that may cause the inductive angular-position sensors to be more accurate than other inductive angular-position sensors. Additionally or alternatively, one or more examples may include inductive angular-position sensors that are more accurate than other inductive angular-position sensors.

As a non-limiting example, one or more examples may include sense coils or targets having a shapes that may cause sense signals from the respective sense coils to exhibit desirable waveform shapes, e.g., waveform shapes that are close-to-ideal waveform shapes, without limitation. The shapes of path portions of the sense coils or targets may be related to how the sense signals generated therein are amplitude modulated as a target disrupts magnetic field between the one or more oscillator coils and the first and second sense coils. As a non-limiting example, as a target rotates above the first and second sense coils and disrupts the magnetic field between the one or more oscillator coils and the first and second sense coils, the shape of the first and second sense coils, or the target, or both, may determine the shape of an amplitude-modulation envelope exhibited by the first and second sense signals. As a non-limiting example, an amplitude-modulation envelope of first and second sense signals of first and second sense coils, respectively, of one or more examples may be close to a sinusoidal shape. A sinusoidally-shape amplitude-modulation envelope may be well-suited for translation into an angular position e.g., through a trigonometric function e.g., arctangent, without limitation.

For example, in one or more examples, path portions of coils (e.g., lobes of sense coils, without limitation) may define an inner-circumferential portion and an outer-circumferential portion. The inner-circumferential portions may have a radius of curvature that is greater than a radius of curvature of the outer-circumferential portions. In some examples, the path portions may include straight radial portions between the inner-circumferential portions and the outer-circumferential portions. Such path portions may result in sense signals that, as they are amplitude modulated by disruptions of a magnetic field by a rotating target, exhibit desirable amplitude-modulation envelope, e.g., a sinusoidally-shaped amplitude-modulation envelope, without limitation.

Additionally or alternatively, one or more examples may include or allow for more turns in the sense coils than other inductive angular-position sensors. More turns in the sense coils may cause the examples to be more sensitive than other inductive angular-position sensors. Sense coils with more turns than other sense coils may exhibit a higher degree of magnetic coupling between the sense coils and the oscillator coil than other sense coils exhibit. Increased magnetic coupling may result in sense coils with more turns exhibiting sense signals of greater amplitude than sense coils with fewer turns. Additionally or alternatively, sense coils with more turns than other sense coils may be more sensitive to disruption of the magnetic field by a target than other sense coils. As a non-limiting example, the amplitude modulation exhibited by a sense coil with more turns may have a greater magnitude than the magnitude of the amplitude modulation exhibited by a sense coil with fewer turns. Sense coils with more turns may allow examples sensors to be more accurate than other inductive angular-position sensors.

Additionally or alternatively, sense coils with more turns may allow sensors to include a larger airgap than sensors including fewer turns. In other words, sense coils with more turns may have greater manufacturing tolerances or design tolerances. As a non-limiting example, as a result of the increased sensitivity of sense coils including more turns, inductive angular-position sensors including more turns may be designed or constructed to include a target positioned farther away from sense coils or the oscillator coil than other inductive angular-position sensors including sense coils including fewer turns while still exhibiting similar magnitudes of amplitude modulation as a result of target rotation.

In the present disclosure, references to things (including sense coils, oscillator coils, and paths, without limitation) being "at," "in," "on," "arranged at," "arranged in," "arranged on," and like terms, in relation to a support structure, may refer to the things being arranged substantially within or on a surface of the support structure. As a non-limiting example, sense coils may include conductive lines in one or more planes (e.g., layers, without limitation) of a printed circuit board (PCB). A sense coil arranged at a support structure may include conductive lines in multiple layers within the support structure.

Figure 1:
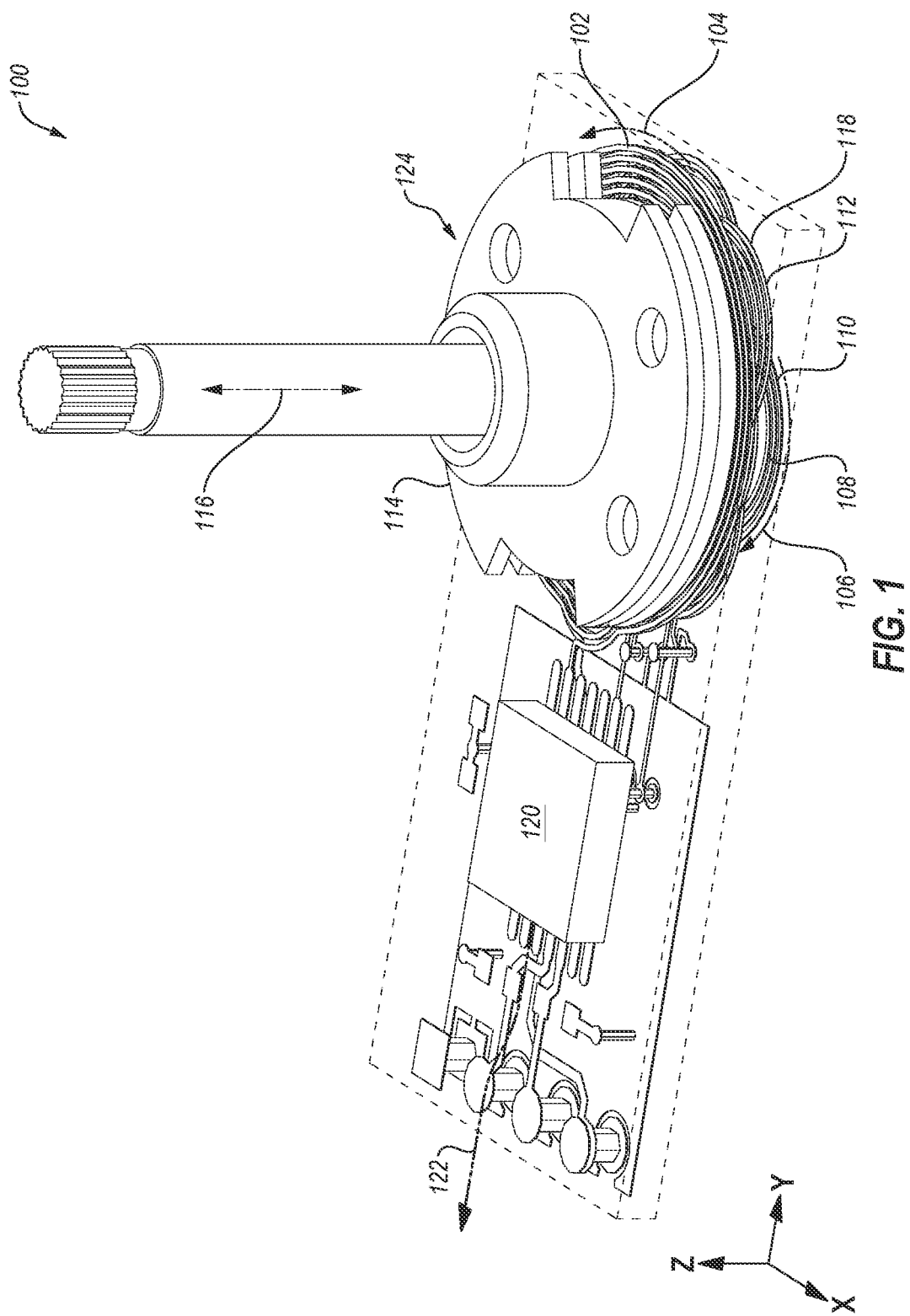
FIG. 1 is a perspective view of a three-dimensional schematic of an apparatus according to one or more examples.

FIG. 1 is a perspective view of a three-dimensional schematic of an apparatus 100 according to one or more examples. Apparatus 100 may be an inductive angular-position sensor according to one or more examples.

Apparatus 100 may include an oscillator coil 102 to carry an excitation signal 104 to induce a sense signal 106 in a first electrically-conductive material 108 of a first sense coil 110 or in a second electrically-conductive material 118 of a second sense coil 112. Apparatus 100 may include a target 114 to rotate around a central axis 116 thereof and to affect magnetic coupling between the excitation signal 104 and the sense signal 106. Apparatus 100 may include an integrated circuit 120 to generate an output signal 122 indicative of an angular position 124 of the target 114 at least partially responsive to the sense signal 106.

Figure 2:
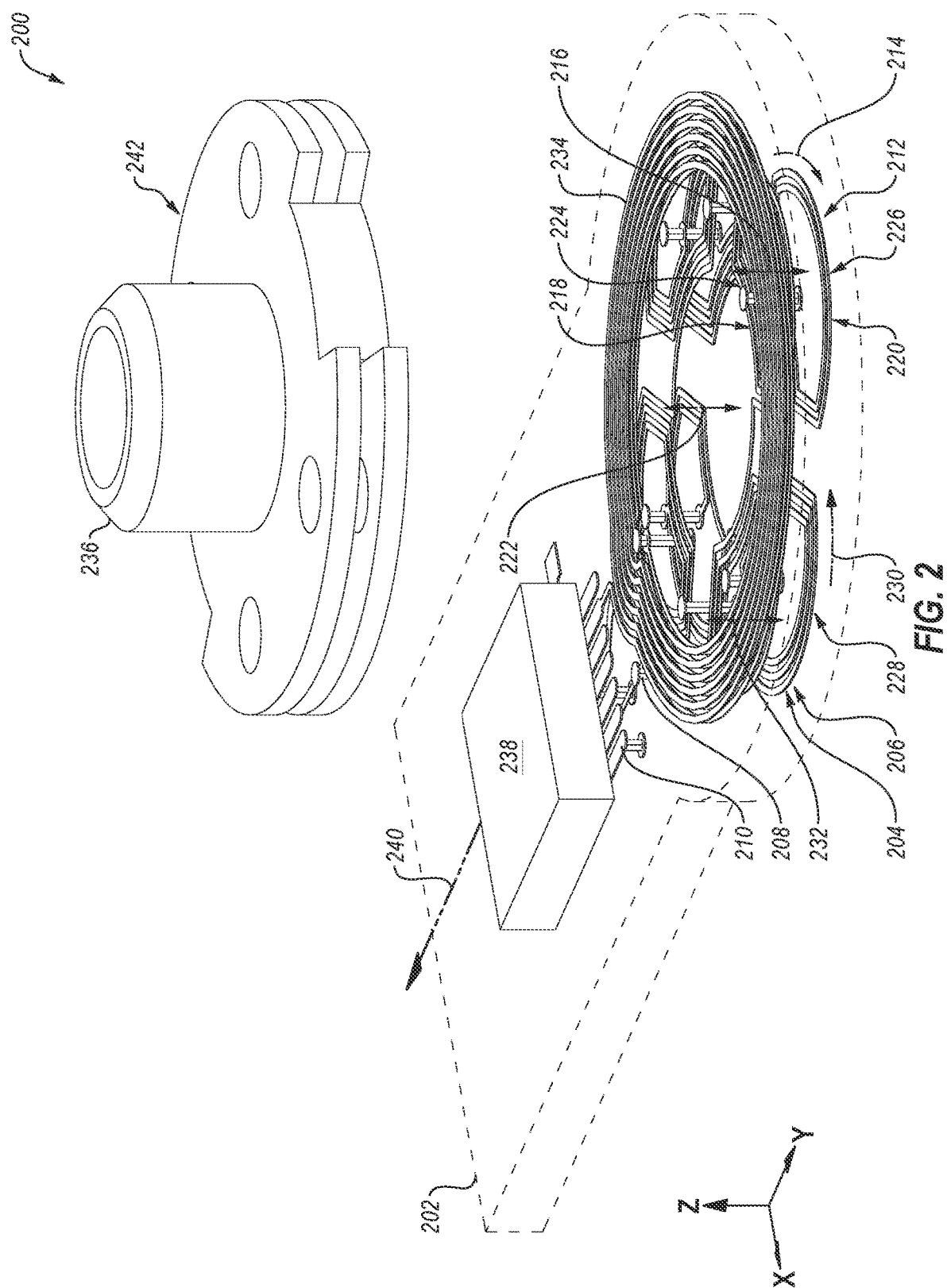
FIG. 2 is a partially-cut-away, exploded, perspective view of a three-dimensional schematic of another apparatus according to one or more examples.

FIG. 2 is a partially-cut-away, exploded, perspective view of a three-dimensional schematic of another apparatus 200 according to one or more examples. Apparatus 200 may be an inductive angular-position sensor according to one or more examples.

Apparatus 200 may include a support structure 202 and an electrically-conductive material 204 arranged at support structure 202 to define a continuous path 206 for electrical current to flow between a first location 208 and a second location 210. Continuous path 206 may include a first path portion 212 defining a generally-clockwise path 214 for the electrical current to flow around a first axis 216. First path portion 212 may include an inner-circumferential portion 218 and an outer-circumferential portion 220. Inner-circumferential portion 218 may be located closer to a central axis 222 than outer-circumferential portion 220 is to central axis 222. A first radius of curvature 224 of inner-circumferential portion 218 may be greater than a second radius of curvature 226 of outer-circumferential portion 220. Continuous path 206 may include a second path portion 228 defining a generally-counter-clockwise path 230 for the electrical current to flow around a second axis 232. First path portion 212 and second path portion 228 may be circumferentially arranged around central axis 222. Apparatus 200 may include an oscillator coil 234 arranged around central axis 222. Apparatus 200 may include a target 236 arranged to rotate about central axis 222. Apparatus 200 may include an integrated circuit 238 to generate an output signal 240 indicative of an angular position 242 of target 236.

The terms generally-clockwise path, and generally counter-clockwise path, as used herein, are not meant to be absolute, and are meant to differentiate one path from the other. Those skilled in the art will recognize that the excitation signal, such as excitation signal 104, oscillates, and thus current in the excitation coil and in the first and second sense coils regularly change direction. At a particular point in time, when current in the generally counter-clockwise path is generally clockwise, current in the generally counter-clockwise path will be generally counter-clockwise.

Apparatus 200 may be the same as, or substantially similar to, apparatus 100 of FIG. 1. As a non-limiting example, electrically-conductive material 204 may be the same as, or substantially similar to, first electrically-conductive material 108 of FIG. 1. Electrically-conductive material 204 in continuous path 206 may be the same as, or substantially similar to, first sense coil 110 of FIG. 1. Central axis 222 may be the same as, or substantially similar to, central axis 116 of FIG. 1. Oscillator coil 234 may be the same as, or substantially similar to, oscillator coil 102 of FIG. 1. Target 236 may be the same as, or substantially similar to, target 114 of FIG. 1. Integrated circuit 238 may be the same as, or substantially similar to, integrated circuit 120 of FIG. 1. Output signal 240 may be the same as, or substantially similar to, output signal 122 of FIG. 1. Angular position 242 may be the same as, or substantially similar to, angular position 124 of FIG. 1. Apparatus 200 may include additional elements not illustrated in FIG. 2 for clarity. For example, apparatus 200 may include a second sense coil, which is not illustrated in FIG. 2.

Figure 3:
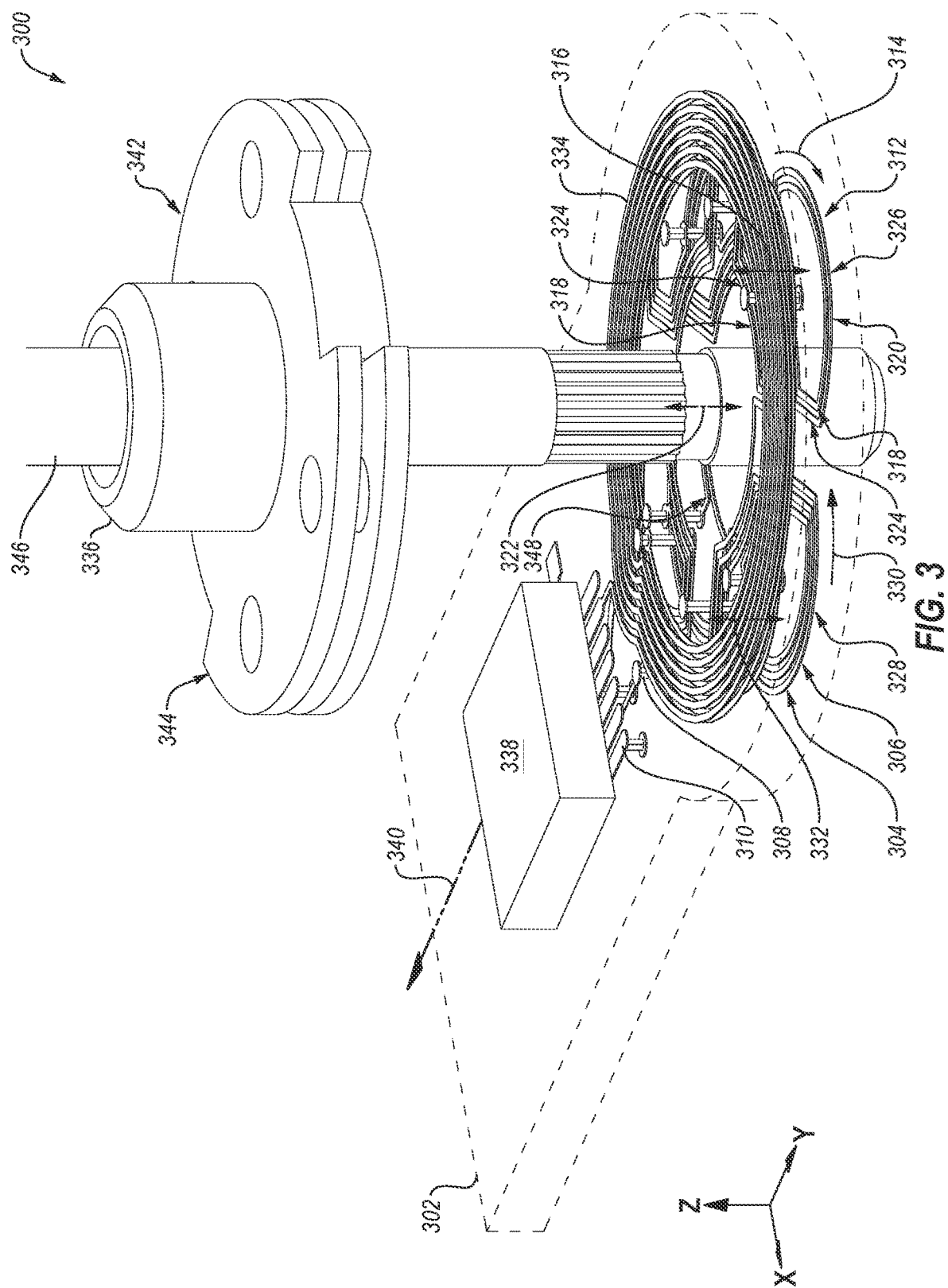
FIG. 3 is a partially-exploded perspective view of a three-dimensional schematic of another apparatus according to one or more examples.

FIG. 3 is a partially-exploded perspective view of a three-dimensional schematic of another apparatus 300 according to one or more examples. Apparatus 300 may be an inductive angular-position sensor according to one or more examples.

Apparatus 300 may be the same as, or substantially similar to apparatus 200 of FIG. 2. As a non-limiting example, apparatus 300 may include many elements that are the same as, or substantially similar to, elements of apparatus 200. In FIG. 3, a reference number having the same last two digits as a corresponding reference number in FIG. 2, may indicate that elements referenced by the respective reference numbers are substantially the same in FIG. 3 as they are in FIG. 2, absent explicit description to the contrary. As a non-limiting example, support structure 302 of FIG. 3 may be substantially the same as support structure 202 of FIG. 2.

In addition to the elements that correspond to elements described with regard to FIG. 2, support structure 302 defines a hole 348, target 336 of apparatus 300 includes an extending portion 344 and target 336 is coupled to a shaft 346.

In one or more examples, target 336 includes extending portion 344 extending above continuous path 306. Extending portion 344 may be above more than half of continuous path 306.

In one or more examples, target 336 may be coupled to shaft 346 which may extending through hole 348 defined by the support structure 302.

In one or more examples, the oscillator coil 334 may be substantially above or beneath outer-circumferential portion 320 of first path portion 312. In one or more examples, oscillator coil 334 may be center-tapped.

Figure 4:
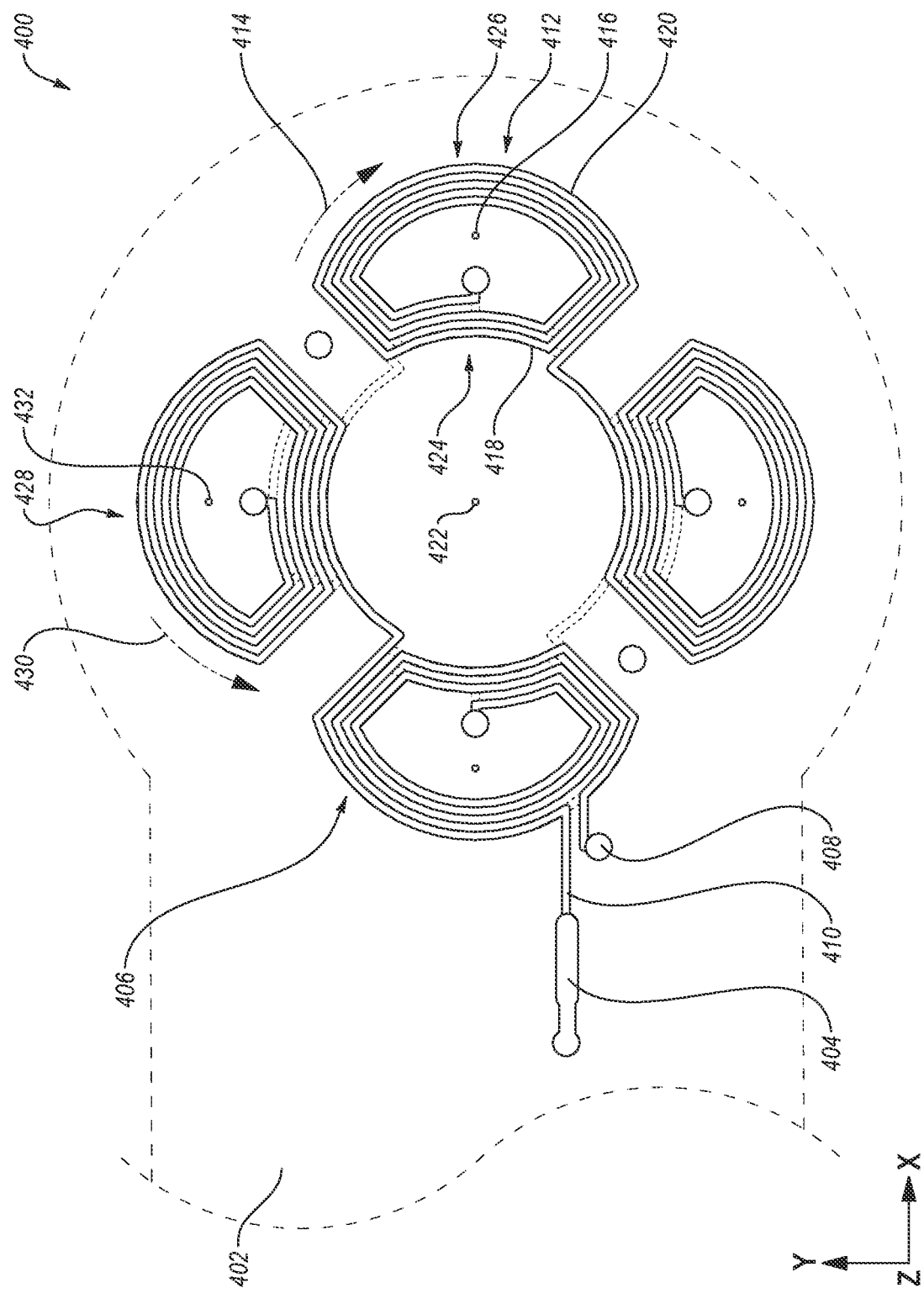
FIG. 4 is a top view of a schematic of an apparatus according to one or more examples.

FIG. 4 is a top view of a schematic of an apparatus 400 according to one or more examples. Apparatus 400 may include a sense coil of an inductive angular-position sensor according to one or more examples.

Apparatus 400 includes a support structure 402 and a first electrically-conductive material 404. First electrically-conductive material 404 may be arranged at support structure 402 to define a first continuous path 406 for first electrical current to flow between a first location 408 and a second location 410. First continuous path 406 may include a first path portion 412 defining a first generally-clockwise path 414 for the first electrical current to flow around a first axis 416. First path portion 412 may include a first inner-circumferential portion 418 and a first outer-circumferential portion 420. First inner-circumferential portion 418 may be located closer to a central axis 422 than first outer-circumferential portion 420 is to central axis 422. A first radius of curvature 424 of first inner-circumferential portion 418 may be greater than a second radius of curvature 426 of first outer-circumferential portion 420. First continuous path 406 may include a second path portion 428 defining a first generally-counter-clockwise path 430 for the first electrical current to flow around a second axis 432. First path portion 412 and second path portion 428 may be circumferentially arranged around central axis 422.

First continuous path 406 may be, or may be included in, a sense coil of an inductive angular-position sensor. As a non-limiting example, first continuous path 406 may be, or may be included in, first sense coil 110 of apparatus 100 of FIG. 1. Additionally or alternatively, first continuous path 406 may be the same as, or substantially similar to, continuous path 206 of FIG. 2. The inductive angular-position sensor may include additional elements not illustrated in FIG. 4 including, for example, an oscillator coil (e.g., oscillator coil 102 of FIG. 1 or oscillator coil 234 of FIG. 2, without limitation), another sense coil (e.g., second sense coil 112 of FIG. 1, without limitation), an integrated circuit (e.g., integrated circuit 120 of FIG. 1 or integrated circuit 238 of FIG. 8, without limitation), or a target (e.g., target 114 of FIG. 1 or target 236, without limitation).

First continuous path 406 may be arranged in two or more respective planes connected by vias e.g., such that a segment of first continuous path 406 may pass over or under or be over or under another segment of first continuous path 406 without electrically connecting except at vias, without limitation. Portions of first continuous path 406 in a first plane are illustrated using solid lines and portions of first continuous path 406 in a second plane (e.g., below the first plane) are illustrated using dotted lines. Additionally, first continuous path 406 may pass over or under another continuous path (e.g., of another sense coil or an oscillator coil, without limitation). Support structure 402 may be formed of a nonconductive material to support first continuous path 406 in one or more planes or layers. First continuous path 406 on, or in, support structure 402 may be conductive lines on, or in, a PCB. Unless stated otherwise, other paths or coils (e.g., sense coils or paths thereof and oscillator coils or paths thereof, without limitation) and electrical connections e.g., between coils and integrated circuits, may likewise be electrically conductive lines on, or in, support structure 402, without limitation.

First continuous path 406 may be formed of first electrically-conductive material 404 and may provide a path for electrical current to flow between first location 408 and second location 410. First location 408 and second location 410 are provided as example locations to define first continuous path 406 as a path for current. First location 408 and second location 410 may, or may not, be proximate to, or at inputs of, an integrated circuit (not illustrated in FIG. 4) of an inductive angular-position sensor.

The shape of first continuous path 406 or of path portions of first continuous path 406 (e.g., first path portion 412 and second path portion 428, without limitation) may be related to a sense signal generated in first continuous path 406 as a target (not illustrated in FIG. 4) disrupts magnetic coupling between first continuous path 406 and an oscillator coil (not illustrated in FIG. 4). As a non-limiting example, as portions of the target pass over path portions of first continuous path 406, the path portions may disrupt the magnetic coupling to different degrees. As a non-limiting example, if a portion of the target is over first path portion 412 entirely, an amplitude of a sense signal in first continuous path 406 may be less than it would be if the target were not over first path portion 412. As another example, if the target were to rotate such that it is not over first path portion 412, an amplitude of the sense signal in first continuous path 406 would be greater than it was were the target over first continuous path 406.

The shape of first continuous path 406 may cause a sense signal therein to have a particular waveform shape as a target rotates over first continuous path 406. The particular waveform shape may have attributes that make it desirable for translating the target position into an output signal indicative of the target position. As a non-limiting example, the particular waveform shape may exhibit a sinusoidally-shaped amplitude-modulation envelope as the target rotates. The sinusoidally-shaped amplitude-modulation envelope may be accurately translated into an angular target position by using a geometric function, e.g., an arctangent, without limitation. To generate the angular target position, the geometric function may be applied to the sinusoidally-shaped amplitude-modulation envelope of the sense signal and to another sinusoidally-shaped amplitude-modulation envelope of another sense signal, which other sense signal may be 90 degrees removed from the sense signal.

As a non-limiting example, the shape of first path portion 412, including first inner-circumferential portion 418 and first outer-circumferential portion 420, first inner-circumferential portion 418 having a greater first radius of curvature 424 than second radius of curvature 426 of first outer-circumferential portion 420 may result in a particular waveform shape in a sense signal responsive to a target rotating over first continuous path 406.

As a non-limiting example, the following equations may be used to define or "draw" first continuous path 406:

$$x = (a + b*\sin(n*t))*\cos(t); \text{ and}$$

$$y = (a + b*\sin(n*t))*\sin(t);$$

for: $t = 0$ to $2*pi$;

where:

$a = (\text{inner radius} + \text{outer radius})/2;$ $b = (\text{outer radius} - \text{inner radius})/2;$ the inner radius is a first distance between the central axis and a nearest point of the inner-circumferential portion;

the outer radius is a second distance between the central axis and a farthest point of the outer-circumferential portion; and n is an integer related to a measurement range of the apparatus.

First continuous path 406 is described as being between first location 408 and second location 410 for descriptive purposes. Electrical current may traverse first continuous path 406 from first location 408 to second location 410 or from second location 410 to first location 408. In some examples, the electrical current may be oscillating. As a non-limiting example, the sense signal in first continuous path 406 may be an oscillating signal responsive to an oscillating signal in an oscillator coil (not illustrated in FIG. 4). In such examples, between one time and a next time, i.e., during a first half of a cycle, the current may flow in first continuous path 406 in the direction described. According to the oscillation of the excitation signal, and the oscillation of the sense signal, during a second half of the cycle the current may traverse the first continuous path 406 in the reverse direction.

Further, first path portion 412 is described as defining first generally-clockwise path 414 and second path portion 428 is described as defining first generally-counter-clockwise path 430 for descriptive purposes. The electrical current may flow in first path portion 412 in a generally-clockwise direction around first axis 416 or in a generally-counter-clockwise direction (whether the electrical current is flowing from first location 408 to second location 410 or from second location 410 to first location 408). Similarly, the electrical current may flow in second path portion 428 in a generally-clockwise direction around second axis 432 or in a generally-counter-clockwise direction (whether the electrical current is flowing from first location 408 to second location 410 or from second location 410 to first location 408).

It may be however, that current may flow around adjacent axes in opposite directions. As a non-limiting example, if current flows in first path portion 412 in first generally-clockwise path 414 around first axis 416 in a generally-clockwise direction, the current may flow in second path portion 428 (adjacent to first axis 416) in first generally-counter-clockwise path 430 around second axis 432 in a generally-counter-clockwise direction. Likewise, if current flows in first path portion 412 in generally-counter-clockwise direction around first axis 416, the current may flow in second path portion 428 (adjacent to first axis 416) in generally-clockwise direction around second axis 432.

In FIG. 4, first continuous path 406 is illustrated as including four path portions for illustrative purposes. In other examples, first continuous path 406 may include any even number of path portions. The number of path portions may be determinative of a number of cycles of amplitude modulation a sense signal experiences as a target rotates 360° around central axis 422. As a non-limiting example, an inductive angular-position sensor including a sense coil arranged as first continuous path 406 including four path portions may result in two complete cycles of amplitude modulation as a target rotates 360° around central axis 422. Including more path portions may result in more cycles of amplitude modulation. Thus, an inductive angular-position sensor including a sense coil arranged as first continuous path 406 including six path portions may result in three complete cycles of amplitude modulation as a target rotates 360° around central axis 422.

Figure 5:
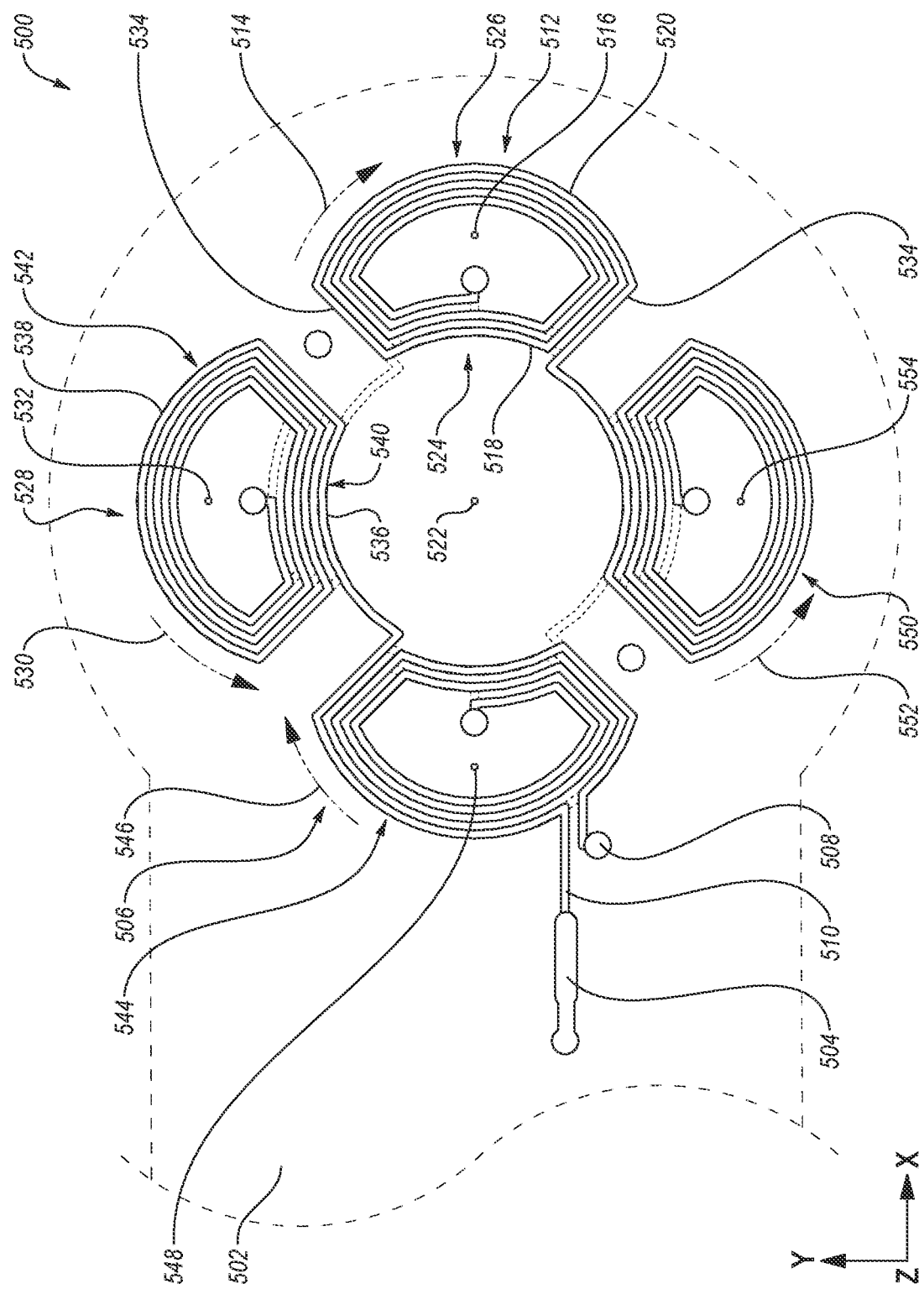
FIG. 5 is a top view of a schematic of another apparatus according to one or more examples.

FIG. 5 is a top view of a schematic of another apparatus 500 according to one or more examples. Apparatus 500 may include a sense coil of an inductive angular-position sensor according to one or more examples.

Apparatus 500 may be the same as, or substantially similar to apparatus 400 of FIG. 4. As a non-limiting example, apparatus 500 may include many elements that are the same as, or substantially similar to, elements of apparatus 400. In FIG. 5, a reference number having the same last two digits as a corresponding reference number in FIG. 4, may indicate that elements referenced by the respective reference numbers are substantially the same in FIG. 5 as they are in FIG. 4, absent explicit description to the contrary. As a non-limiting example, support structure 502 of FIG. 5 may be substantially the same as support structure 402 of FIG. 4. Portions of first continuous path 506 in a first plane are illustrated using solid lines and portions of first continuous path 506 in a second plane (e.g., below the first plane) are illustrated using dotted lines.

In addition to the elements that correspond to elements described with regard to FIG. 4, apparatus 500 includes: radial portions 534 of first path portion 512, a second inner-circumferential portion 536 of second path portion 528, a second outer-circumferential portion 538 of second path portion 528, a third radius of curvature 540 of second inner-circumferential portion 536, a fourth radius of curvature 542 of second outer-circumferential portion 538, a third path portion 544, a second generally-clockwise path 546, a third axis 548, a fourth path portion 550, a second generally-counter-clockwise path 552, and a fourth axis 554.

In one or more examples, first path portion 512 may define radial portions 534 between first inner-circumferential portion 518 and first outer-circumferential portion 520. Radial portions 534 may be substantially straight.

In one or more examples, second path portion 528 may include second inner-circumferential portion 536 and second outer-circumferential portion 538. Second inner-circumferential portion 536 may be located closer to central axis 522 than second outer-circumferential portion 538 is to central axis 522. Third radius of curvature 540 of second inner-circumferential portion 536 may be greater than fourth radius of curvature 542 of second outer-circumferential portion 538.

In one or more examples, path portions may be substantially radially symmetric one to another. Additionally or alternatively, first continuous path 506 as a whole may be said to exhibit substantial radial symmetry.

In one or more examples, first continuous path 506 may additionally include third path portion 544 and fourth path portion 550. Third path portion 544 may define second generally-clockwise path 546 for electrical current to flow around third axis 548. Fourth path portion 550 may define second generally-counter-clockwise path 552 for the electrical current to flow around fourth axis 554. First path portion 512, second path portion 528, third path portion 544, and fourth path portion 550 may be circumferentially arranged around central axis 522 with second path portion 528 arranged between first path portion 512 and third path portion 544 and third path portion 544 between second path portion 528 and fourth path portion 550.

Figure 6:
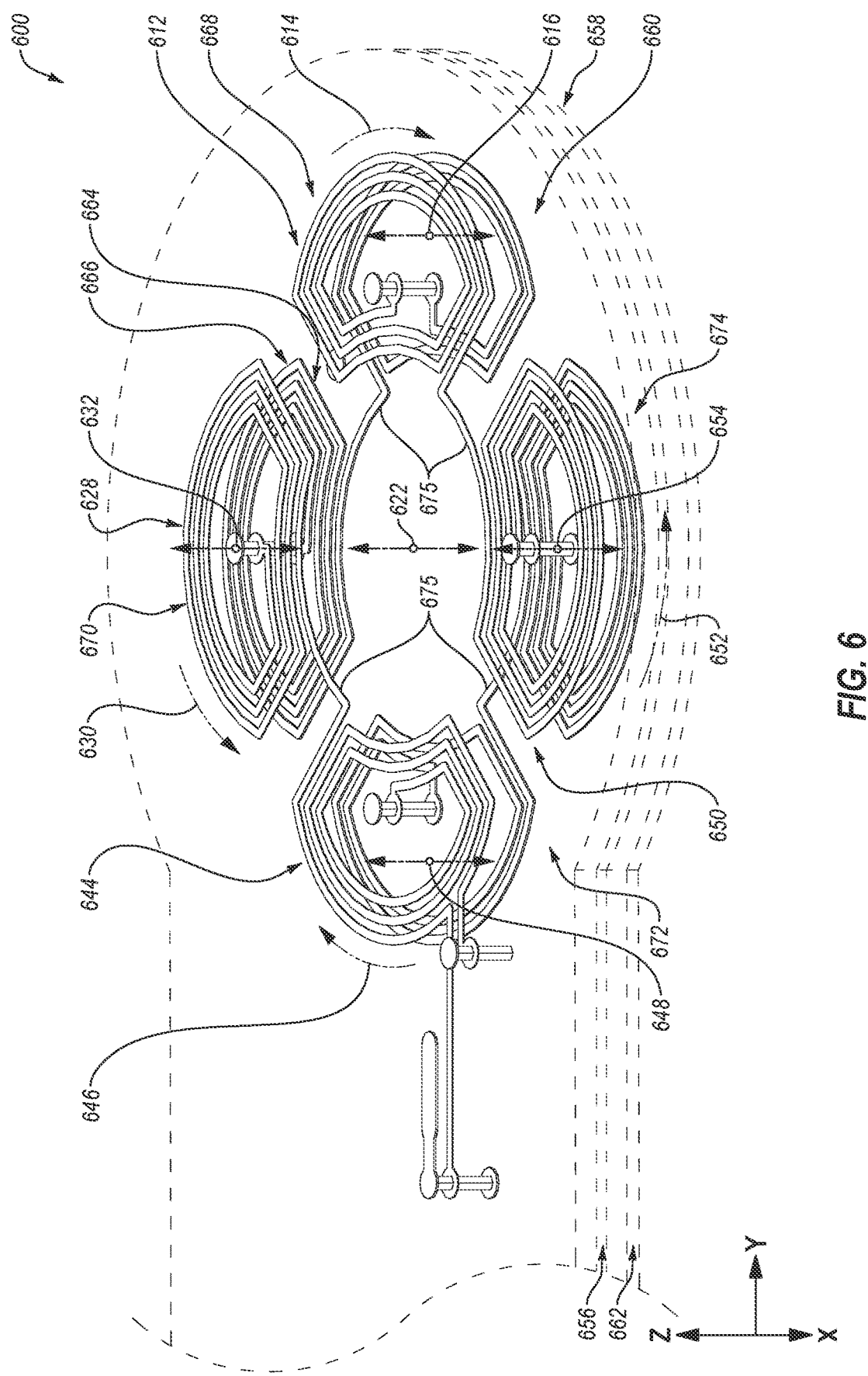
FIG. 6 is perspective view of a three-dimensional schematic of another apparatus according to one or more examples.

FIG. 6 is perspective view of a three-dimensional schematic of another apparatus 600 according to one or more examples. Apparatus 600 may include a sense coil of an inductive angular-position sensor according to one or more examples.

Apparatus 600 may be the same as, or substantially similar to apparatus 500 of FIG. 5 or to apparatus 400 of FIG. 4. As a non-limiting example, apparatus 600 may include many elements that are the same as, or substantially similar to, elements of apparatus 500 or apparatus 400. In FIG. 6, a reference number having the same last two digits as a corresponding reference number in FIG. 5 or FIG. 4, may indicate that elements referenced by the respective reference numbers are substantially the same in FIG. 6 as they are in FIG. 5 or FIG. 4, absent explicit description to the contrary. As a non-limiting example, first path portion 612 of FIG. 6 may be substantially the same as first path portion 512 of FIG. 5 or as first path portion 412 of FIG. 4.

In addition to the elements that correspond to elements described with regard to FIG. 4 and FIG. 5, apparatus 600 includes: a first plane 656, a fifth path portion 658, a third generally-clockwise path 660, a second plane 662, a sixth path portion 664, a third generally-counter-clockwise path 666, passes 668 around first axis 616, passes 670 around second axis 632, passes 672 around third axis 648, and passes 674 around fourth axis 654.

In one or more examples, first path portion 612, second path portion 628, third path portion 644, and fourth path portion 650 may all be arranged substantially in first plane 656. First continuous path 606 may additionally include fifth path portion 658 and sixth path portion 664. Fifth path portion 658 may define third generally-clockwise path 660 for electrical current to flow around first axis 616. Fifth path portion 658 may be substantially beneath first path portion 612. Fifth path portion 658 may be substantially in second plane 662, which second plane 662 may be below first plane 656. Sixth path portion 664 may define third generally-counter-clockwise path 666 for the electrical current to flow around second axis 632. Sixth path portion 664 may be substantially beneath second path portion 628. Sixth path portion 664 may be substantially in second plane 662.

In one or more examples, a first count of passes 668 around the first axis 616 of first generally-clockwise path 614 may be greater than, or fewer than, a second count of passes 670 around second axis 632 of first generally-counter-clockwise path 630.

Additionally or alternatively, in one or more examples, a third count of passes 672 around third axis 648 of second generally-clockwise path 646 may be the same as the first count (of passes 686). Further, a fourth count of passes 674 around fourth axis 654 of second generally-counter-clockwise path 652 may be the same as the second count (of passes 670).

For example, first count of passes 668 around the first axis 616 may be five (including three passes of first path portion 612 in first plane 656 and two passes of fifth path portion 658 in second plane 662). Further, the second count of passes 670 around the second axis 632 may be six (including three passes of second path portion 628 in first plane 656 and three passes sixth path portion 664 in second plane 662). Further, third count of passes 672 around third axis 648 may be five and the fourth count of passes 674 may be six.

First count of passes 668 around the first axis 616 being greater than, or fewer than, second count of passes 670 around second axis 632 may contribute to a desirable waveform shape of a sense signal generated in first continuous path 606. As a non-limiting example, portions 675 of the first continuous path 606 between the path portions (e.g., between first path portion 612, second path portion 628, third path portion 644, fourth path portion 650, fifth path portion 658 and sixth path portion 664) may result, unless compensated for, in a direct current (DC) offset in the sense signal generated in the first continuous path. Having a different number of clockwise passes around axes than the number of counter-clockwise passes around axes may compensate for DC offset that would otherwise be generated responsive the portions 675 of the first continuous path 606 between the path portions.

Figure 7:
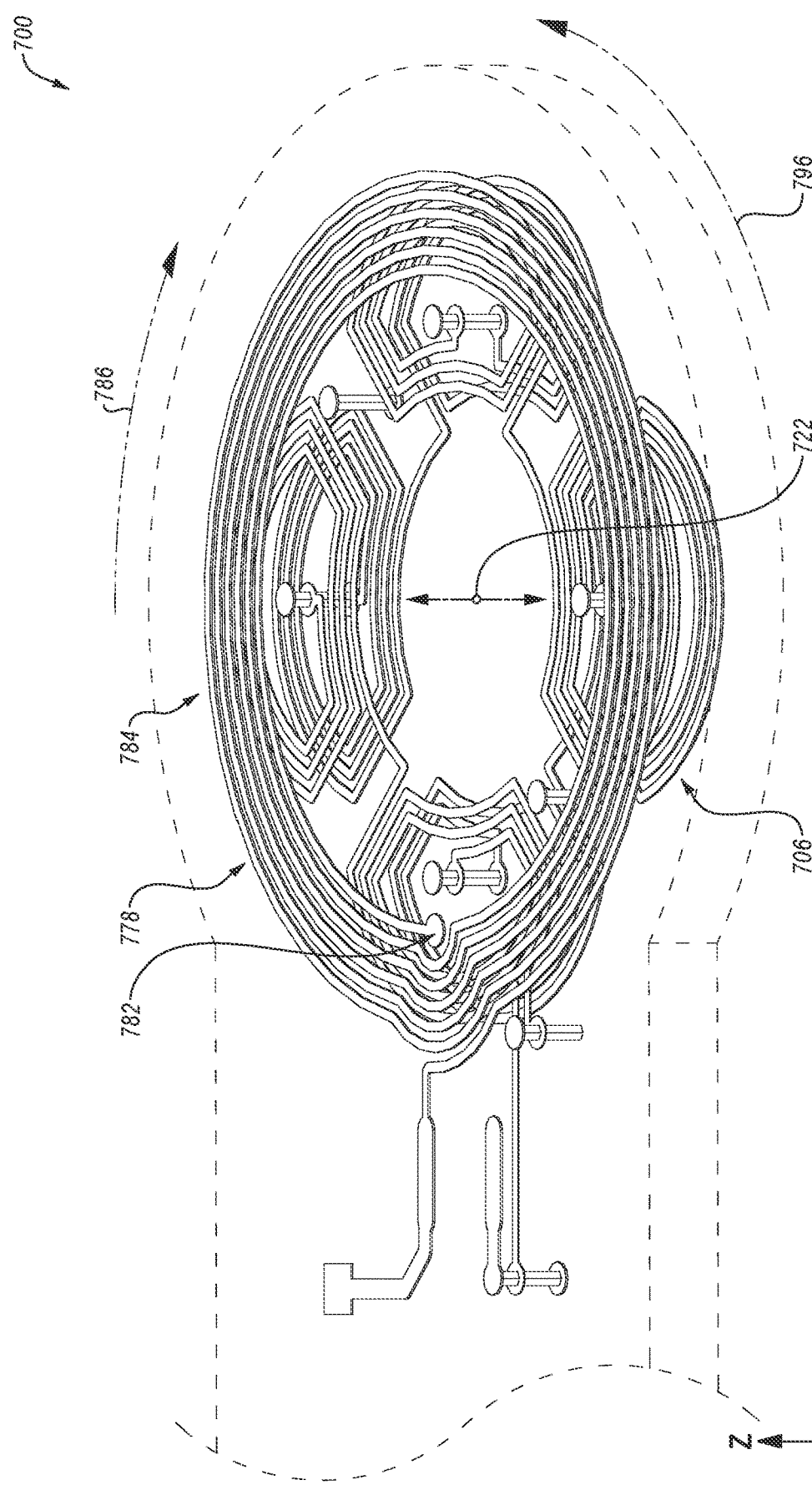
FIG. 7 is perspective view of a three-dimensional schematic of another apparatus according to one or more examples.

FIG. 7 is perspective view of a three-dimensional schematic of another apparatus 700 according to one or more examples. Apparatus 700 may include a sense coil and an oscillator coil 784 of an inductive angular-position sensor according to one or more examples.

In addition to the elements that correspond to elements described with regard to FIG. 4, FIG. 5, and FIG. 6, apparatus 700 includes: a second electrically-conductive material 776 defining a second continuous path 778 of an oscillator coil 784.

Oscillator coil 784 may be arranged in two planes. Oscillator coil 784 may be center-tapped. As a non-limiting example, oscillator coil 784 may include an inwardly-spiraling path 786 and an outwardly-spiraling path 796 e.g., inwardly-spiraling path 786 in a first plane and outwardly-spiraling path in a second plane.

Oscillator coil 784 may be above (or under) one or more sense coils. As a non-limiting example, oscillator coil 784 may be above first continuous path 706. Specifically, in some examples, oscillator coil 784 may be over outer-circumferential portions of path portions of first continuous path 706.

Figure 8:
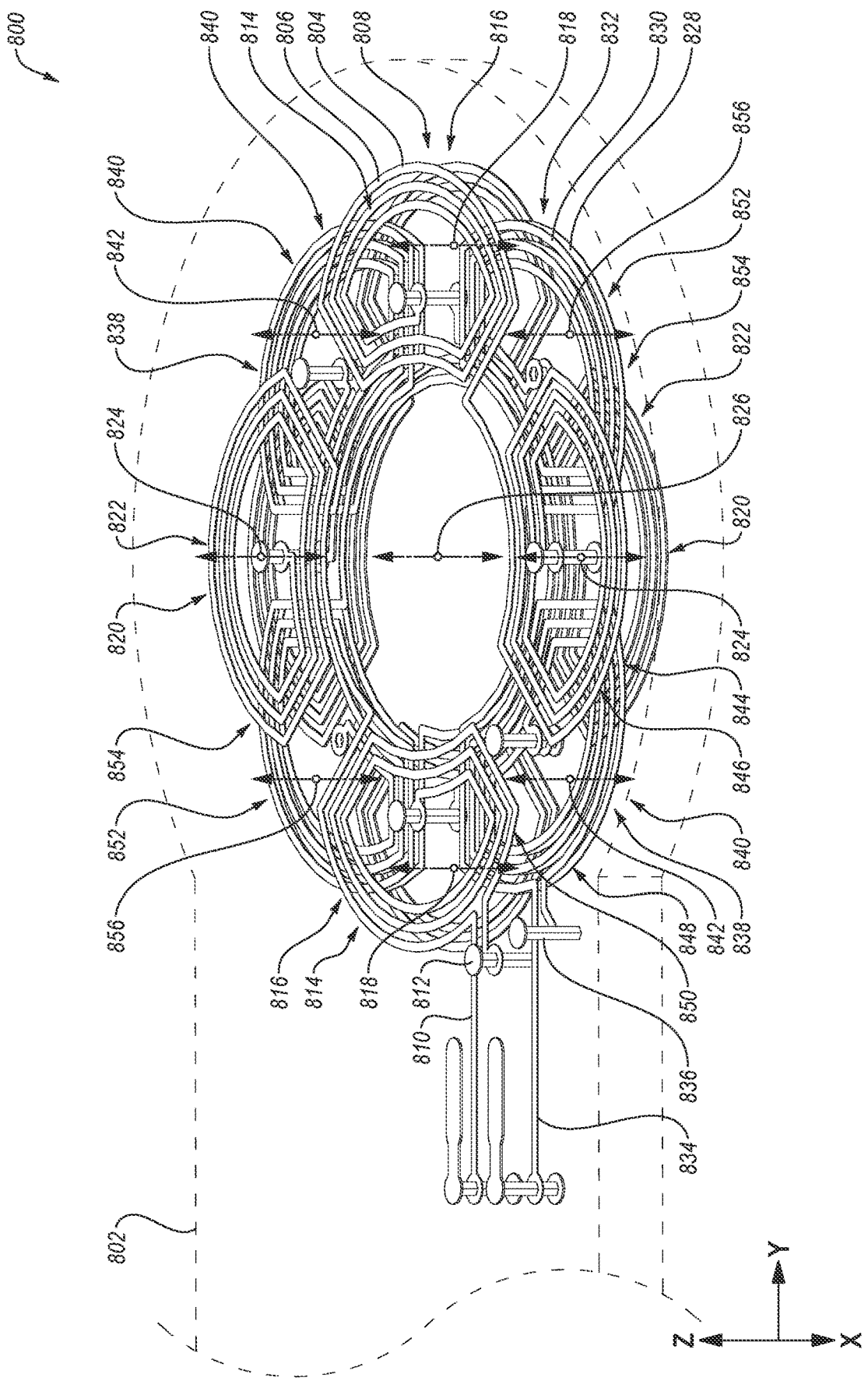
FIG. 8 is perspective view of a three-dimensional schematic of another apparatus according to one or more examples.

FIG. 8 is perspective view of a three-dimensional schematic of another apparatus 800 according to one or more examples. Apparatus 800 may include two sense coils of an inductive angular-position sensor according to one or more examples. In FIG. 8, a reference number having the same last two digits as a corresponding reference number in any of FIG. 4, FIG. 5, FIG. 6, and FIG. 7, may indicate that elements referenced by the respective reference numbers are substantially the same in FIG. 8 as they are in any of FIG. 4, FIG. 5, FIG. 6, and FIG. 7, absent explicit description to the contrary.

Apparatus 800 includes a support structure 802, a first sense coil 804, and a second sense coil 828. First sense coil 804 may be, or may include, a first electrically-conductive material 806 arranged at support structure 802 to define a first continuous path 808 for first electrical current to flow between a first location 810 and a second location 812. First continuous path 808 may include a number of respective first path portions 814 defining respective generally-clockwise paths 816 for the first electrical current to flow around a number of respective first axes 818. First continuous path 808 may include a number of respective second path portions 820 defining respective generally-counter-clockwise paths 822 for the first electrical current to flow around a number of respective second axes 824. The number of respective first path portions 814 and the number of respective second path portions 820 of the first continuous path 808 may be alternatingly circumferentially arranged around a central axis 826. Second sense coil 828 may be, or may include, a second electrically-conductive material 830 arranged at support structure 802 to define a second continuous path 832 for second electrical current to flow between a third location 834 and a fourth location 836. Second continuous path 832 may include a number of respective first path portions 838 defining respective generally-clockwise paths 840 for the second electrical current to flow around a number of respective third axes 842. A respective first portion 844 of each of the number of respective first path portions 838 of the second continuous path 832 may be above, or beneath, a respective second portion 846 of a respective one of the number of respective second path portions 820 of the first continuous path 808. Similarly, a respective third portion 848 of each of the number of first respective path portions 838 of the second continuous path 832 above, or beneath, a fourth portion 850 of a respective one of the number of respective second path portions 820 of the first continuous path 808. Second continuous path 832 may include a number of respective second path portions 852 defining respective generally-counter-clockwise paths 854 for the second electrical current to flow around a number of respective fourth axes 856. The number of respective first path portions 838 and the number of respective second path portions 852 of the second continuous path 832 may be alternatingly circumferentially arranged around central axis 826.

Support structure 802 may be the same as, or substantially similar to, support structure 402 of FIG. 4, support structure 502 of FIG. 5, or support structure 702 of FIG. 7. First sense coil 804 may be an example of first sense coil 110 of FIG. 1. First sense coil 804 for example, as formed of first electrically-conductive material 806 in first continuous path 808 may be the same as, or substantially similar to, first electrically-conductive material 404 in first continuous path 406 of FIG. 4, first electrically-conductive material 504 in first continuous path 506 of FIG. 5, or first electrically-conductive material 704 in first continuous path 706 of FIG. 7. First location 810 and second location 812 may respectively be the same as, or substantially similar to, first location 408 and second location 410 of FIG. 4, first location 508 and second location 510 of FIG. 5, or first location 708 and second location 610 of FIG. 7.

First path portions 814 may be the same as, or substantially similar to, first path portion 412 of FIG. 4, first path portion 512 and third path portion 544 of FIG. 5, or first path portion 612 and third path portion 644 of FIG. 6. First generally-clockwise paths 816 may be the same as, or substantially similar to, first generally-clockwise path 414 of FIG. 4, first generally-clockwise path 514 and second generally-clockwise path 546 of FIG. 5, or first generally-clockwise path 614 and second generally-clockwise path 646 of FIG. 6. First axes 818 may be the same as, or substantially similar to, first axis 416 of FIG. 4, first axis 516 and third axis 548 of FIG. 5, or first axis 616 and third axis 648 of FIG. 6.

Second path portion 820 may be the same as, or substantially similar to, second path portion 428 of FIG. 4, second path portion 528 and fourth path portion 550 of FIG. 5, or second path portion 628 and fourth path portion 650 of FIG. 6. First generally-counter-clockwise path 822 may be the same as, or substantially similar to, first generally-counter-clockwise path 430 of FIG. 4, first generally-counter-clockwise path 530 and second generally-counter-clockwise path 552 of FIG. 5, first generally-counter-clockwise path 630 and second generally-counter-clockwise path 652 of FIG. 6. Second axes 824 may be the same as, or substantially similar to, second axis 432 of FIG. 4, second axis 532 and fourth axis 554 of FIG. 5, or second axis 632 and fourth axis 654 of FIG. 6. Central axis 826 may be the same as, or substantially similar to, central axis 422 of FIG. 4, central axis 522 of FIG. 5, central axis 622 of FIG. 6, or central axis 722 of FIG. 7.

First sense coil 804 may include two first path portions 814 and two second path portions 820. Second sense coil 828 may include two third path portions 838 and two fourth path portions 852.

Second sense coil 828 may be the same as, or substantially similar to, first sense coil 804. However, second sense coil 828 may be rotated on support structure 802 relative to the orientation of first sense coil 804 on support structure 802. As a non-limiting example, second sense coil 828 may be substantially symmetrical to first sense coil 804. Further, second sense coil 828 may be the same as, or substantially similar to, first sense coil 804 yet points of electrical coupling between first sense coil 804 and first continuous path 808 and first location 810 may differ from points of electrical coupling between second sense coil 828 and third location 834 and fourth location 836.

As a non-limiting example referring to the example of apparatus 800, first sense coil 804 may include two first path portions 814 and two second path portions 820. Second sense coil 828 may include two third path portion 838, each of which may be substantially symmetric to the two first path portion 814 of first sense coil 804. Second sense coil 828 may include two fourth path portions 852, each of which may be substantially symmetric to the two second path portion 820 of first sense coil 804.

All of first path portions 814, second path portions 820, third path portions 838, and fourth path portions 852 may include inner-circumferential portions and outer-circumferential portions. The inner-circumferential portions may have greater respective radii of curvature than respective radii of curvature of respective outer-circumferential portions.

Figure 9:
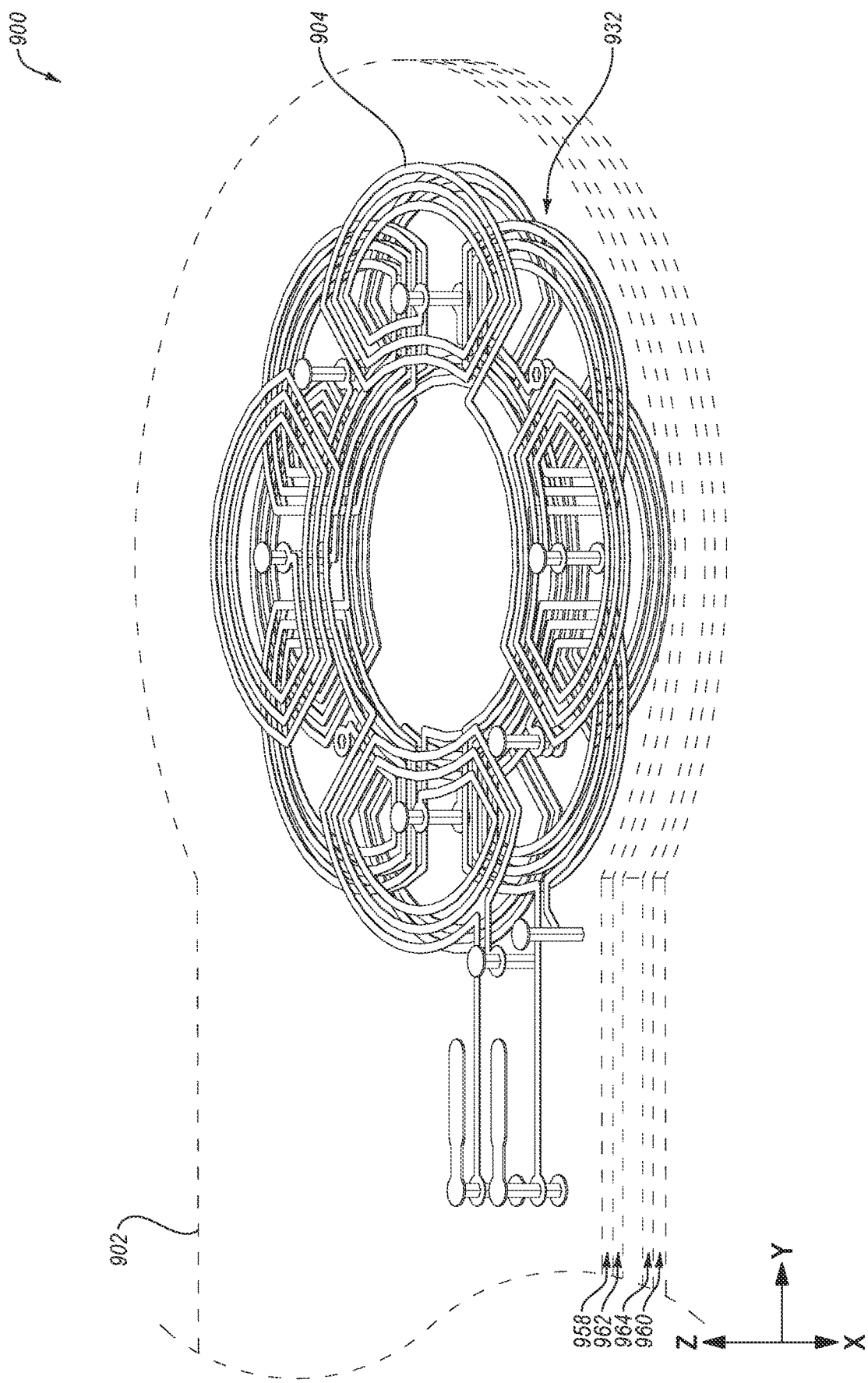
FIG. 9 is perspective view of a three-dimensional schematic of another apparatus according to one or more examples.

FIG. 9 is perspective view of a three-dimensional schematic of another apparatus 900 according to one or more examples. Apparatus 900 may include two sense coils of an inductive angular-position sensor according to one or more examples.

Apparatus 900 may be the same as, or substantially similar to apparatus 800 of FIG. 8. As a non-limiting example, apparatus 900 may include many elements that are the same as, or substantially similar to, elements of apparatus 800. In FIG. 9, a reference number having the same last two digits as a corresponding reference number in FIG. 8, may indicate that elements referenced by the respective reference numbers are substantially the same in FIG. 9 as they are in FIG. 8, absent explicit description to the contrary. As a non-limiting example, support structure 902 of FIG. 5 may be substantially the same as support structure 802 of FIG. 8.

Particularly illustrated in FIG. 9 are a first plane 958, a second plane 960, a third plane 962, and a fourth plane 964. First plane 958 and second plane 960 may be the same as, or substantially similar to, first plane 656 and second plane 662 of FIG. 6.

In one or more examples, first continuous path 908 of first sense coil 904 may be arranged in first plane 958 and in a fourth plane 964. Second continuous path 932 may be arranged in third plane 962 and in second plane 960. Third plane 962 and fourth plane 964 may be between first plane 958 and second plane 960.

FIG. 10 includes two graphs illustrating simulated modulated signals according to one or more examples. In particular, FIG. 10 includes a first graph 1002 illustrating an example first sense signal 1004 of a first sense coil and a second graph 1008 illustrating an example second sense signal 1010 of a second sense coil.

First graph 1002 illustrates a normalized signal amplitude of first sense signal 1004 as a function of an angular position of a target, e.g., as the target rotates around an axis, without limitation. Similarly second graph 1008 illustrates a normalized signal amplitude of second sense signal 1010 as a function of an angular position of the target.

First sense signal 1004 includes a carrier signal (e.g., generated in response to an oscillating signal at an oscillator coil, without limitation) enveloped by a first amplitude-modulation envelope 1006. Similarly, second sense signal 1010 includes the carrier signal (e.g., generated in response to the oscillating signal at the oscillator coil, without limitation) enveloped by a second amplitude-modulation envelope 1012. The carrier signal illustrated with respect to first sense signal 1004 and the carrier signal illustrated with respect to second sense signal 1010 are simulated for illustrative purposes. For example, the carrier signal may oscillate with respect to time and time has not be illustrated in first graph 1002 and second graph 1008. Thus, the carrier signals are illustrated as if the target were rotating at a constant rotational speed, in time.

First sense signal 1004 may have been obtained from a sense coil such as, as a non-limiting example, first sense coil 110 of FIG. 1, electrically-conductive material 204 in continuous path 206 of FIG. 2, electrically-conductive material 304 in continuous path 306 of FIG. 3, first electrically-conductive material 404 in first continuous path 406 of FIG. 4, first electrically-conductive material 504 in first continuous path 506 of FIG. 5, first electrically-conductive material 704 in first continuous path 706 of FIG. 7, first sense coil 804 of FIG. 8, or first sense coil 904 of FIG. 9.

Second sense signal 1010 may have been obtained from a second sense coil that may be the same as, or substantially similar to, to the sense coil from which first sense signal 1004 was obtained, but rotated by 45°. As a non-limiting example, in FIG. 10, it can be observed that first amplitude-modulation envelope 1006 is 45° out of phase with (e.g., ahead of, without limitation) second amplitude-modulation envelope 1012. As a non-limiting example, second sense signals 1010 may have been obtained from a second sense coil 828 of FIG. 8 or second sense coil 928 of FIG. 9.

The carrier frequency illustrated in FIG. 10 was intentionally selected to be near the order of magnitude of the rotational frequency of the target to illustrate that first sense signal 1004 second sense signal 1010 are modulated signals. In one or more examples, the carrier frequency of the first sense signal 1004 and the second sense signal 1010 may be 1 MHz to 6 MHz, as a non-limiting example which may be orders of magnitude greater than the frequency of first amplitude-modulation envelope 1006 and second amplitude-modulation envelope 1012. A frequency of first amplitude-modulation envelope 1006 and second amplitude-modulation envelope 1012 may be based on a rotational frequency of a target, e.g., the target disrupting magnetic field between an oscillator coil and each of the first sense coil and the second sense coil, without limitation.

FIG. 11 is a graph 1102 illustrating a simulated demodulated first sense signal 1104 and a simulated demodulated second sense signal 1106 according to one or more examples.

Graph 1102 illustrates a normalized signal amplitude of demodulated first sense signal 1104 and demodulated second sense signal 1106 as a function of an angular position of a target, e.g., as the target rotates around an axis, without limitation.

Demodulated first sense signal 1104 may have been obtained by demodulating first sense signal 1004. In other words, demodulated first sense signal 1104 may be directly related to first amplitude-modulation envelope 1006 of first sense signal 1004. Similarly, demodulated second sense signal 1106 may have been obtained by demodulating second sense signal 1010. Similarly, demodulated second sense signal 1106 may be directly related to second amplitude-modulation envelope 1012 of second sense signal 1010.

In one or more examples, an integrated circuit (e.g., integrated circuit 120, integrated circuit 238, or integrated circuit 338, without limitation) may generate demodulated first sense signal 1104 and demodulated second sense signal 1106 as output signals (e.g., output signal 122, output signal 240, or output signal 340, without limitation) indicative of an angular position (e.g., angular position 124 angular position 242 or angular position 342, without limitation) of a target (e.g., target 114, target 236, or target 336, without limitation).

FIG. 12 is a graph 1202 illustrating a simulated output signal 1204 according to one or more examples. Graph 1202 illustrates output signal 1204 having a range of 0 volts to 5 volts (as an example) as a function of an angular position of a target, e.g., as the target rotates in a clockwise direction around an axis, without limitation.

Output signal 1204 may have been obtained by performing an operation, e.g., a geometric operation, e.g., an arctangent, without limitation, on demodulated first sense signal 1104 and demodulated second sense signal 1106 of FIG. 11. As a non-limiting example, output signal 1204 may be the arctangent of demodulated first sense signal 1104 and demodulated second sense signal 1106.

Output signal 1204 has a constant slope as a function of the angular position of the target.

In one or more examples, an integrated circuit (e.g., integrated circuit 120, integrated circuit 238, or integrated circuit 338, without limitation) may generate output signal 1204 as output signals (e.g., output signal 122, output signal 240, or output signal 340, without limitation) indicative of an angular position (e.g., angular position 124 angular position 242 or angular position 342, without limitation) of a target (e.g., target 114, target 236, or target 336, without limitation). Output signal 1204 may indicate (based on amplitude) an angular position of the target. Output signal 1204 (based on a slope of the signal over time) may indicate a direction of rotation of the target over time.

FIG. 13 is a graph 1302 illustrating a simulated output signal 1304 according to one or more examples. Graph 1302 illustrates output signal 1304 having a range of 0 volts to 5 volts (as an example) as a function of an angular position of a target, e.g., as the target rotates in a counter-clockwise direction around an axis, without limitation.

Output signal 1304 may have been obtained by performing an operation, e.g., a geometric operation, e.g., an arctangent, without limitation, on demodulated first sense signal 1104 and demodulated second sense signal 1106 of FIG. 11. As a non-limiting example, output signal 1304 may be the arctangent of demodulated first sense signal 1104 and demodulated second sense signal 1106.

Output signal 1304 has a constant slope as a function of the angular position of the target. The slope of output signal 1304 may be the opposite of the slope of output signal 1204 because output signal 1204 may have been generated responsive to a target rotating around the axis in a clockwise direction while output signal 1304 may have been generated responsive to the target rotating around the axis in a counter-clockwise direction. Output signal 1304 may indicate (based on amplitude) an angular position of the target. Output signal 1304 (based on a slope of the signal over time) may indicate a direction of rotation of the target over time.

In one or more examples, an integrated circuit (e.g., integrated circuit 120, integrated circuit 238, or integrated circuit 338, without limitation) may generate output signal 1304 as output signals (e.g., output signal 122, output signal 240, or output signal 340, without limitation) indicative of an angular position (e.g., angular position 124 angular position 242 or angular position 342, without limitation) of a target (e.g., target 114, target 236, or target 336, without limitation).

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1. An apparatus comprising: a support structure; and a first electrically-conductive material arranged at the support structure to define a first continuous path for an electrical current to flow between a first location and a second location, the first continuous path comprising: a first path portion defining a first generally-clockwise path for the electrical current to flow around a first axis, the first path portion including a first inner-circumferential portion and a first outer-circumferential portion, the first inner-circumferential portion located closer to a central axis than the first outer-circumferential portion, a radius of curvature of the first inner-circumferential portion being greater than a radius of curvature of the first outer-circumferential portion; and a second path portion defining a first generally-counter-clockwise path for the electrical current to flow around a second axis, the first path portion and the second path portion circumferentially arranged around the central axis.

Example 2. The apparatus according to Example 1, wherein the first path portion defines two radial portions between the first inner-circumferential portion and the first outer-circumferential portion, the radial portions being substantially straight.

Example 3. The apparatus according to any of Examples 1 and 2, wherein the second path portion includes a second inner-circumferential portion and a second outer-circumferential portion, the second inner-circumferential portion located closer to the central axis than the second outer-circumferential portion, a third radius of curvature of the second inner-circumferential portion being greater than a fourth radius of curvature of the second outer-circumferential portion.

Example 4. The apparatus according to any of Examples 1 through 3, wherein the first continuous path comprises: a third path portion defining a second generally-clockwise path for the electrical current to flow around a third axis; and a fourth path portion defining a second generally-counter-clockwise path for the electrical current to flow around a fourth axis, and wherein the first path portion, the second path portion, the third path portion, and the fourth path portion are circumferentially arranged around the central axis with the second path portion arranged between the first path portion and the third path portion and the third path portion between the second path portion and the fourth path portion.

Example 5. The apparatus according to any of Examples 1 through 4, wherein the first path portion, the second path portion, the third path portion, and the fourth path portion are all arranged substantially in a first plane, the first continuous path comprising: a fifth path portion defining a third generally-clockwise path for the electrical current to flow around the first axis, the fifth path portion substantially above or beneath the first path portion in a second plane; and a sixth path portion defining a third generally-counter-clockwise path for the electrical current to flow around the second axis, the sixth path portion substantially above or beneath the second path portion in the second plane.

Example 6. The apparatus according to any of Examples 1 through 5, wherein a first count of passes around the first axis of the first generally-clockwise path is greater than, or fewer than, a second count of passes around the second axis of the first generally-counter-clockwise path.

Example 7. The apparatus according to any of Examples 1 through 6, wherein a third count of passes around the third axis of the second generally-clockwise path is the same as the first count of passes and wherein a fourth count of passes around the fourth axis of the second generally-counter-clockwise path is the same as the second count of passes.

Example 8. The apparatus according to any of Examples 1 through 7, wherein a first count of passes around the first axis of the first generally-clockwise path is greater than, or fewer than, a second count of passes around the second axis of the first generally-counter-clockwise path.

Example 9. The apparatus according to any of Examples 1 through 8, comprising: an oscillator coil to carry an excitation signal to induce a sense signal in the first electrically-conductive material; a target to rotate around the central axis and to affect magnetic coupling between the excitation signal and the sense signal; and an integrated circuit to generate an output signal indicative of an angular position of the target at least partially responsive to the sense signal.

Example 10. An apparatus, comprising: a support structure; a first sense coil comprising a first electrically-conductive material arranged at the support structure to define a first continuous path for a first electrical current to flow between a first location and a second location, the first continuous path comprising: a number of respective first path portions defining respective generally-clockwise paths for the first electrical current to flow around a number of respective first axes; and a number of respective second path portions defining respective generally-counter-clockwise paths for the first electrical current to flow around a number of respective second axes, the number of respective first path portions and the number of respective second path portions of the first continuous path alternatingly circumferentially arranged around a central axis; and a second sense coil comprising a second electrically-conductive material arranged at the support structure to define a second continuous path for a second electrical current to flow between a third location and a fourth location, the second continuous path comprising: a number of respective first path portions defining respective generally-clockwise paths for the second electrical current to flow around a number of respective third axes; and a number of respective second path portions defining respective generally-counter-clockwise paths for the second electrical current to flow around a number of respective fourth axes, the number of respective first path portions and the number of respective second path portions of the second continuous path alternatingly circumferentially arranged around the central axis.

Example 11. The apparatus according to Example 10, wherein the first continuous path is arranged in a first plane and in a second plane, wherein the second continuous path is arranged in a third plane and in a fourth plane, and wherein the third plane and the fourth plane are between the first plane and the second plane.

Example 12. The apparatus according to any of Examples 10 and 11, wherein the first continuous path comprises two respective first path portions and two respective second path portions and the second continuous path comprises two respective first path portions and two respective second path portions.

Example 13. The apparatus according to any of Examples 10 through 12, wherein the respective first path portions and the respective second path portions of the first continuous path and of the second continuous path respectively comprise a respective inner-circumferential portion and a respective outer-circumferential portion, the respective inner-circumferential portions located closer to the central axis than the respective outer-circumferential portions, respective radiuses of curvature of the inner-circumferential portions being greater than a respective radiuses of curvature of the outer-circumferential portions.

Example 14. An apparatus comprising: a support structure; an electrically-conductive material arranged at the support structure to define a continuous path for an electrical current to flow between a first location and a second location, the continuous path comprising: a first path portion defining a generally-clockwise path for the electrical current to flow around a first axis, the first path portion including an inner-circumferential portion and an outer-circumferential portion, the inner-circumferential portion located closer to a central axis than the outer-circumferential portion, a radius of curvature of the inner-circumferential portion being greater than a radius of curvature of the outer-circumferential portion; and a second path portion defining a generally-counter-clockwise path for the electrical current to flow around a second axis, the first path portion and the second path portion circumferentially arranged around the central axis; an oscillator coil arranged around the central axis; a target arranged to rotate about the central axis; and an integrated circuit to generate an output signal indicative of an angular position of the target.

Example 15. The apparatus according to Example 14, wherein the target comprises an extending portion above the continuous path.

Example 16. The apparatus according to any of Examples 14 and 15, wherein the extending portion is above more than half of the continuous path.

Example 17. The apparatus according to any of Examples 14 through 16, wherein the target is coupled to a shaft extending through a hole defined by the support structure.

Example 18. The apparatus according to any of Examples 14 through 17, wherein the oscillator coil is substantially above, or beneath, the outer-circumferential portion of the first path portion.

Example 19. The apparatus according to any of Examples 14 through 18, wherein the oscillator coil is center-tapped.

While the present disclosure has been described with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:
1. An apparatus comprising:
a support structure; and
a first electrically-conductive material arranged at the support structure to define a first continuous path for an electrical current to flow between a first location and a second location, the first continuous path comprising:
a first path portion defining a first generally-clockwise path for the electrical current to flow around a first axis;
a second path portion defining a first generally-counter-clockwise path for the electrical current to flow around a second axis;
a third path portion defining a second generally-clockwise path for the electrical current to flow around a third axis;
a fourth path portion defining a second generally-counter-clockwise path for the electrical current to flow around a fourth axis;
the first path portion, the second path portion, the third path portion, and the fourth path portion circumferentially arranged substantially in a first plane around a central axis, the third path portion opposite the first path portion and the fourth path portion opposite the second path portion;
respective ones of the first path portion, the second path portion, the third path portion, and the fourth path portion including a first inner-circumferential portion and a first outer-circumferential portion, the first inner-circumferential portion located closer to the central axis than the first outer-circumferential portion, a radius of curvature of the first inner-circumferential portion being greater than a radius of curvature of the first outer-circumferential portion;
a fifth path portion defining a third generally-clockwise path for the electrical current to flow around the first axis;
a sixth path portion defining a third generally-counter-clockwise path for the electrical current to flow around the second axis;
a seventh path portion defining a fourth generally-clockwise path for the electrical current to flow around the third axis;
an eighth path portion defining a fourth generally-counter-clockwise path for the electrical current to flow around the fourth axis;
the fifth path portion, the sixth path portion, the seventh path portion, and the eighth path portion circumferentially arranged substantially in a second plane around the central axis, the seventh path portion opposite the fifth path portion and the eighth path portion opposite the sixth path portion; and
respective ones of the fifth path portion, the sixth path portion, the seventh path portion, and the eighth path portion including a second inner-circumferential portion and a second outer-circumferential portion, the second inner-circumferential portion located closer to the central axis than the second outer-circumferential portion, a radius of curvature of the second inner-circumferential portion being greater than a radius of curvature of the second outer-circumferential portion.

2. The apparatus of claim 1, wherein:
respective ones of the first path portion, the second path portion, the third path portion, and the fourth path portion define two radial portions between the first inner-circumferential portion and the first outer-circumferential portion, the two radial portions being substantially straight; and respective ones of the fifth path portion, the sixth path portion, the seventh path portion, and the eighth path portion define two radial portions between the second inner-circumferential portion and the second outer-circumferential portion, the two radial portions being substantially straight.

3. The apparatus of claim 1, wherein:

the fifth path portion is substantially above or beneath the first path portion in the second plane and electrically coupled to the first path portion through a first electrical connection;

the sixth path portion is substantially above or beneath the second path portion in the second plane and electrically coupled to the second path portion through a second electrical connection;

the seventh path portion is substantially above or beneath the third path portion in the second plane and electrically coupled to the third path portion through a third electrical connection; and the eighth path portion is substantially above or beneath the fourth path portion in the second plane and electrically coupled to the fourth path portion through a fourth electrical connection.

4. The apparatus of claim 1, wherein a first count of passes around the first axis of the first generally-clockwise path is greater than, or fewer than, a second count of passes around the second axis of the first generally-counter-clockwise path.

5. The apparatus of claim 4, wherein a third count of passes around the third axis of the second generally-clockwise path is the same as the first count of passes and wherein a fourth count of passes around the fourth axis of the second generally-counter-clockwise path is the same as the second count of passes.

6. The apparatus of claim 1, wherein a first count of passes around the first axis of the first generally-clockwise path is greater than, or fewer than, a second count of passes around the second axis of the first generally-counter-clockwise path.

7. The apparatus of claim 1, comprising:

an oscillator coil to carry an excitation signal to induce a sense signal in the first electrically-conductive material;

a target to rotate around the central axis and to affect magnetic coupling between the excitation signal and the sense signal; and an integrated circuit to generate an output signal indicative of an angular position of the target at least partially responsive to the sense signal.

8. An apparatus, comprising:

a support structure;

a first sense coil comprising a first electrically-conductive material arranged at the support structure to define a first continuous path for a first electrical current to flow between a first location and a second location, the first continuous path comprising:

a number of respective first path portions defining respective generally-clockwise paths for the first electrical current to flow around a number of respective first axes; and a number of respective second path portions defining respective generally-counter-clockwise paths for the first electrical current to flow around a number of respective second axes, the number of respective first path portions and the number of respective second path portions of the first continuous path alternatingly circumferentially arranged around a central axis; and a second sense coil comprising a second electrically-conductive material arranged at the support structure to define a second continuous path for a second electrical current to flow between a third location and a fourth location, the second continuous path comprising:

a number of respective first path portions defining respective generally-clockwise paths for the second electrical current to flow around a number of respective third axes; and a number of respective second path portions defining respective generally-counter-clockwise paths for the second electrical current to flow around a number of respective fourth axes, the number of respective first path portions and the number of respective second path portions of the second continuous path alternatingly circumferentially arranged around the central axis, wherein the respective first path portions and the respective second path portions of the first continuous path and of the second continuous path respectively comprise a respective inner-circumferential portion and a respective outer-circumferential portion, the respective inner-circumferential portions located closer to the central axis than the respective outer-circumferential portions, respective radiuses of curvature of the respective inner-circumferential portions being greater than a respective radiuses of curvature of the outer-circumferential portions.

9. The apparatus of claim 8, wherein the first continuous path is arranged in a first plane and in a second plane, wherein the second continuous path is arranged in a third plane and in a fourth plane, and wherein the third plane and the fourth plane are between the first plane and the second plane.

10. The apparatus of claim 8, wherein the first continuous path comprises two respective first path portions and two respective second path portions and the second continuous path comprises two respective first path portions and two respective second path portions.

11. An apparatus comprising:

a support structure;

an electrically-conductive material arranged at the support structure to define a continuous path for an electrical current to flow between a first location and a second location, the continuous path comprising:

a first path portion defining a first generally-clockwise path for the electrical current to flow around a first axis;

a second path portion defining a first generally-counter-clockwise path for the electrical current to flow around a second axis;

a third path portion defining a second generally-clockwise path for the electrical current to flow around a third axis;

a fourth path portion defining a second generally-counter-clockwise path for the electrical current to flow around a fourth axis;

the first path portion, the second path portion, the third path portion, and the fourth path portion circumferentially arranged substantially in a first plane around a central axis, the third path portion opposite the first path portion and the fourth path portion opposite the second path portion;

respective ones of the first path portion, the second path portion, the third path portion, and the fourth path portion including a first inner-circumferential portion and a first outer-circumferential portion, the first inner-circumferential portion located closer to the central axis than the first outer-circumferential portion, a radius of curvature of the first inner-circumferential portion being greater than a radius of curvature of the first outer-circumferential portion;

a fifth path portion defining a third generally-clockwise path for the electrical current to flow around the first axis;

a sixth path portion defining a third generally-counter-clockwise path for the electrical current to flow around the second axis;

a seventh path portion defining a fourth generally-clockwise path for the electrical current to flow around the third axis;

an eighth path portion defining a fourth generally-counter-clockwise path for the electrical current to flow around the fourth axis;

the fifth path portion, the sixth path portion, the seventh path portion, and the eighth path portion circumferentially arranged substantially in a second plane around the central axis, the seventh path portion opposite the fifth path portion and the eighth path portion opposite the sixth path portion; and respective ones of the fifth path portion, the sixth path portion, the seventh path portion, and the eighth path portion including a second inner-circumferential portion and a second outer-circumferential portion, the second inner-circumferential portion located closer to the central axis than the second outer-circumferential portion, a radius of curvature of the second inner-circumferential portion being greater than a radius of curvature of the second outer-circumferential portion; and an oscillator coil arranged around the central axis;

a target arranged to rotate about the central axis; and an integrated circuit to generate an output signal indicative of an angular position of the target.

12. The apparatus of claim 11, wherein the target comprises an extending portion above the continuous path.

13. The apparatus of claim 12, wherein the extending portion is above more than half of the continuous path.

14. The apparatus of claim 11, wherein the target is coupled to a shaft extending through a hole defined by the support structure.

15. The apparatus of claim 11, wherein the oscillator coil is substantially above, or beneath, the outer-circumferential portion of the first path portion.

16. The apparatus of claim 11, wherein the oscillator coil is center-tapped.

* * * * *